United States Patent
Masanaga

(10) Patent No.: US 9,139,474 B2
(45) Date of Patent: Sep. 22, 2015

(54) SHRINKAGE-REDUCING AGENT FOR HYDRAULIC MATERIAL AND SHRINKAGE-REDUCING AGENT COMPOSITION FOR HYDRAULIC MATERIAL

(75) Inventor: Mari Masanaga, Suita (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 48 days.

(21) Appl. No.: 13/056,626

(22) PCT Filed: Jul. 29, 2009

(86) PCT No.: PCT/JP2009/063483
§ 371 (c)(1),
(2), (4) Date: Mar. 17, 2011

(87) PCT Pub. No.: WO2010/013744
PCT Pub. Date: Feb. 4, 2010

(65) Prior Publication Data
US 2011/0291053 A1 Dec. 1, 2011

(30) Foreign Application Priority Data

Jul. 31, 2008 (JP) ................................. 2008-197678
Jul. 31, 2008 (JP) ................................. 2008-198125
Aug. 1, 2008 (JP) ................................. 2008-199423

(51) Int. Cl.
| | |
|---|---|
| *C08L 71/08* | (2006.01) |
| *C08L 71/02* | (2006.01) |
| *C04B 24/32* | (2006.01) |
| *C04B 28/02* | (2006.01) |
| *C08F 216/14* | (2006.01) |
| *C08F 220/26* | (2006.01) |
| *C08G 65/26* | (2006.01) |
| *C08G 65/332* | (2006.01) |
| *C04B 103/56* | (2006.01) |
| *C04B 111/20* | (2006.01) |
| *C08L 33/08* | (2006.01) |

(52) U.S. Cl.
CPC ................. *C04B 24/32* (2013.01); *C04B 28/02* (2013.01); *C08F 216/1416* (2013.01); *C08F 220/26* (2013.01); *C08G 65/2609* (2013.01); *C08G 65/3322* (2013.01); *C08L 71/02* (2013.01); *C04B 2103/58* (2013.01); *C04B 2111/29* (2013.01); *C08L 33/08* (2013.01)

(58) Field of Classification Search
CPC ..... C04B 24/32; C04B 2103/58; C08L 71/08; C08L 71/02
USPC .......................................... 106/724, 802, 803
See application file for complete search history.

(56) References Cited

U.S. PATENT DOCUMENTS

| | | | |
|---|---|---|---|
| 4,975,121 A * | 12/1990 | Sakuta et al. ................. | 106/724 |
| 5,174,820 A | 12/1992 | Sakuta et al. | |
| 5,181,961 A | 1/1993 | Umaki et al. | |
| 5,413,634 A | 5/1995 | Shawl et al. | |
| 2006/0293417 A1 | 12/2006 | Taniguchi et al. | |

FOREIGN PATENT DOCUMENTS

| | | |
|---|---|---|
| JP | 56-51148 B2 | 4/1981 |
| JP | 01-53214 B2 | 2/1984 |
| JP | 59-21557 A | 2/1984 |
| JP | 01-53215 B2 | 7/1984 |
| JP | 59-152253 A | 8/1984 |
| JP | 60-06500 B | 1/1994 |
| JP | 7-144947 A | 6/1995 |
| JP | 9-301758 A | 11/1997 |
| JP | 2825855 B2 | 11/1998 |
| JP | 11-180747 A | 7/1999 |
| JP | 2001-294462 A | 10/2001 |
| JP | 2001-294466 A | 10/2001 |
| JP | 2002-068813 A | 3/2002 |
| JP | 2003-226565 A | 8/2003 |
| JP | 2004-299930 A | 10/2004 |
| JP | 2005-281008 A | 10/2005 |
| JP | 2006-256887 A | 9/2006 |
| JP | 2007-076972 A | 3/2007 |
| JP | 2007-210877 A | 8/2007 |
| JP | 2008-094708 A | 4/2008 |

* cited by examiner

*Primary Examiner* — Peter F Godenschwager
(74) *Attorney, Agent, or Firm* — Sughrue Mion, PLLC

(57) ABSTRACT

Provided are a shrinkage-reducing agent for a hydraulic material and a shrinkage-reducing agent composition for a hydraulic material including a compound represented by the general formula (1): $R^1-[O-(A^1O)_m-R^2]_n$ (1), where: $R^1$ represents $R^1$ derived from a polyhydric alcohol represented by $R^1-[OH]_n$; $A^1O$ represents an oxyalkylene group having 2 to 18 carbon atoms; $R^2$ represents a hydrogen atom or a hydrocarbon group having 1 to 30 carbon atoms; m represents an average added mole number of oxyalkylene groups $A^1O$'s; n represents 3 or 4; and when n equals 3, m represents 30 to 150, and when n equals 4, m represents 5 to 150.

11 Claims, No Drawings

SHRINKAGE-REDUCING AGENT FOR HYDRAULIC MATERIAL AND SHRINKAGE-REDUCING AGENT COMPOSITION FOR HYDRAULIC MATERIAL

TECHNICAL FIELD

The present invention relates to a shrinkage-reducing agent for a hydraulic material and a shrinkage-reducing agent composition for a hydraulic material, and more specifically, to a shrinkage-reducing agent for a hydraulic material, which has an excellent shrinkage-reducing function, and a shrinkage-reducing agent composition for a hydraulic material, which brings together an excellent shrinkage-reducing function and an excellent water-reducing function.

BACKGROUND ART

Hydraulic materials provide cured articles excellent in strength, durability, and the like. Accordingly, the hydraulic materials have been widely used as cement compositions such as a cement paste, a mortar, and a concrete. The hydraulic materials are indispensable for the construction of civil engineering and architectural structures.

After having cured, the hydraulic materials may cause the dissipation of unreacted moisture remaining in the materials depending on, for example, ambient temperature and a humidity condition. As a result, such a problem that drying shrinkage progresses and hence each of the cured articles cracks to reduce its strength or durability arises. Reductions in strength, durability, and the like of each of the civil engineering and architectural structures cause serious problems such as a reduction in safety and an increase in repair cost.

Legal regulations against such problems have become increasingly stringent. The cracking of a concrete is also an object of defect liability in a law established in June 1999 concerning the promotion of the securing of housing quality. In the Japanese Architectural Standard Specification for Reinforced Concrete Work revised in February 2009 (JASS 5 (Architectural Institute of Japan)), a shrinkage strain in a concrete with long-term durability (100 years or more) at a 26th week was restricted to $800 \times 10^{-6}$ or less.

Emphasis has been recently placed on shrinkage-reducing agents for hydraulic materials as means for reducing the drying shrinkage of cured concrete articles. Architectural Institute of Japan is scheduled to establish criteria concerning the shrinkage-reducing agents for hydraulic materials simultaneously with the revision of the JASS 5 described above.

An alkylene oxide adduct of an alcohol having 1 to 4 carbon atoms (see Patent Literature 1), an ethylene oxide and propylene oxide co-adduct of a polyhydric alcohol having two to eight hydroxyl groups (see Patent Literature 2), an alkylene oxide adduct of a lower alkylamine (see Patent Literature 3), a polypropylene glycol in an oligomer region (see Patent Literature 4), low-molecular weight alcohols (see Patent Literature 5), and an alkylene oxide adduct of 2-ethylhexanol (see Patent Literature 6) have been reported as the shrinkage-reducing agents for hydraulic materials. However, those shrinkage-reducing agents for hydraulic materials each involve the following problem. When each of the agents is used in a concrete, the strength of the concrete reduces. Accordingly, the ratio of a cement paste is requested to be increased in order that the strength may be secured. As a result, such a problem that a cost for the concrete increases arises.

Alkylene oxide adducts of polyhydric alcohols having two to eight hydroxyl groups have been reported as shrinkage-reducing agents for hydraulic materials, each of which is capable of suppressing a reduction in strength when used in a concrete (see Patent Literatures 7 and 8). However, each of those shrinkage-reducing agents for hydraulic materials requires a combination with any other admixture such as a powder resin or an expansive additive, and hence has been unable to solve the problem, i.e., the increase of the cost for the concrete.

CITATION LIST

Patent Literature

[Patent Literature 1] JP 56-51148 B
[Patent Literature 2] JP 01-53214 B
[Patent Literature 3] JP 01-53215 B
[Patent Literature 4] JP 59-152253 A
[Patent Literature 5] JP 06-6500 B
[Patent Literature 6] JP 2825855 B2
[Patent Literature 7] JP 09-301758 A
[Patent Literature 8] JP 2002-68813 A

SUMMARY OF INVENTION

Technical Problem

An object of the present invention is to provide the following shrinkage-reducing agent for a hydraulic material and shrinkage-reducing agent composition for a hydraulic material each having high general-purpose property. Each of the agent and the composition does not require a combination with any other admixture, is inexpensive, suppresses a reduction in strength of a cured article, suppresses the generation of a crack in a cured concrete body by virtue of its excellent shrinkage-reducing function, and shows such good compatibility with a water-reducing agent as to impart an excellent water-reducing function. Further, each of the agent and the composition can improve the quality of entrained air with an antifoaming agent and an AE agent so easily as to be capable of imparting excellent freezing-thawing resistance to the cured concrete body to improve the durability of the cured concrete body.

Solution to Problem

A shrinkage-reducing agent for a hydraulic material of the present invention includes a compound represented by the general formula (1).

$$R^1\text{—}[O\text{-}(A^1O)_m\text{—}R^2]_n \qquad (1)$$

(In the general formula (1), $R^1$ represents $R^1$ derived from a polyhydric alcohol represented by $R^1$—$[OH]_n$; $A^1O$ represents an oxyalkylene group having 2 to 18 carbon atoms; $R^2$ represents a hydrogen atom or a hydrocarbon group having 1 to 30 carbon atoms; m represents an average added mole number of oxyalkylene groups $A^1O$'s; n represents 3 or 4; and when n equals 3, m represents 30 to 150, and when n equals 4, m represents 5 to 150.)

In a preferred embodiment, the above-mentioned $A^1O$ represents an oxyalkylene group having 2 to 4 carbon atoms.

In a preferred embodiment, oxyethylene groups account for 50 mol % or more of the above-mentioned $A^1O$'s.

In a preferred embodiment, the above-mentioned polyhydric alcohol represented by $R^1$—$[OH]_n$ includes a trimethylolalkane.

In a preferred embodiment, the above-mentioned polyhydric alcohol represented by $R^1$—[OH]$_n$ includes pentaerythritol.

The shrinkage-reducing agent composition for a hydraulic material of the present invention includes the following component A and component B, in which a weight ratio "component A/component B" of the component A to the component B in terms of a solid content is 99.9/0.1 to 55/45.

Component A:

at least one kind selected from a compound represented by the general formula (1) and a polyalkyleneimine.

$$R^1-[O-(A^1O)_m-R^2]_n \qquad (1)$$

In the general formula (1), $R^1$ represents $R^1$ derived from a polyhydric alcohol represented by $R^1$—[OH]$_n$; $A^1O$ represents an oxyalkylene group having 2 to 18 carbon atoms; $R^2$ represents a hydrogen atom or a hydrocarbon group having 1 to 30 carbon atoms; m represents an average added mole number of oxyalkylene groups $A^1O$'s; n represents an integer of 3 or more; and when n equals 3, m represents 30 to 150, when n equals 4, m represents 5 to 450, and when n is equal to or more than 5, m represents 10 to 500.)

Component B:

a polyoxyalkylene-based polymer.

In a preferred embodiment, the shrinkage-reducing agent composition for a hydraulic material of the present invention further includes an AE agent (component C) and an antifoaming agent (component D) at a weight ratio "(component C)/(component D)" in terms of a solid content of 90/10 to 10/90.

In a preferred embodiment, a weight ratio "((component A)+(component C)+(component D))/(component B)" of a total of the above-mentioned component A, component C, and component D to the above-mentioned component B in terms of a solid content is 99.9/0.1 to 40/60.

In a preferred embodiment, the above-mentioned component A includes a compound represented by the above-mentioned general formula (1).

In a preferred embodiment, in the above-mentioned general formula (1): n represents 3 or 4; and when n equals 3, m represents 30 to 150, and when n equals 4, m represents 5 to 150.

In a preferred embodiment, in the above-mentioned general formula (1), the above-mentioned $A^1O$ represents an oxyalkylene group having 2 to 4 carbon atoms.

In a preferred embodiment, in the above-mentioned general formula (1), oxyethylene groups account for 50 mol % or more of the above-mentioned $A^1O$'s.

In a preferred embodiment, in the above-mentioned general formula (1), the above-mentioned polyhydric alcohol represented by $R^1$—[OH]$_n$ includes a trimethylolalkane.

In a preferred embodiment, in the above-mentioned general formula (1), the above-mentioned polyhydric alcohol represented by $R^1$—[OH]$_n$ includes pentaerythritol.

In a preferred embodiment, the above-mentioned polyoxyalkylene-based polymer includes a copolymer obtained by copolymerizing a monomer (I) having a polyoxyalkylene group represented by the general formula (I) and at least one kind of monomer (II) selected from monomers represented by the general formulae (II-1) to (II-3).

[Chem. 1]

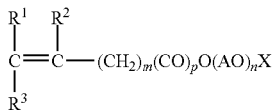

(In the general formula (I), $R^1$ and $R^2$ each represent a hydrogen atom or a methyl group; $R^3$ represents a hydrogen atom, a methyl group, or —(CH$_2$)$_m$(CO)$_p$O(AO)$_n$X; m represents a number of 0 to 2; p represents a number of 0 or 1; AO represents an oxyalkylene group having 2 to 18 carbon atoms; n represents an average added mole number of oxyalkylene groups AO's, and represents 2 to 300; and X represents a hydrogen atom or a hydrocarbon group having 1 to 30 carbon atoms.)

[Chem. 2]

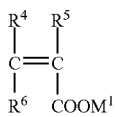

(In the general formula (II-1), $R^4$, $R^5$, and $R^6$ may be identical to or different from each other, and each represent a hydrogen atom, a methyl group, or —(CH$_2$)$_r$COOM$^2$; —(CH$_2$)$_r$COOM$^2$ may form an anhydride with COOM$^1$ or any other —(CH$_2$)$_r$COOM$^2$, and in this case, M$^1$ or M$^2$ of any one of these groups is absent; M$^1$ and M$^2$ each represent a hydrogen atom, an alkali metal, an alkaline earth metal, an ammonium group, an alkylammonium group, a substituted alkylammonium group, or an organic amine group; and r represents a number of 0 to 2.)

[Chem. 3]

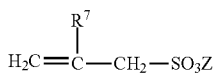

(In the general formula (II-2), $R^7$ represents a hydrogen atom or a methyl group; and Z represents a hydrogen atom, an alkali metal, an alkaline earth metal, an ammonium group, an alkylammonium group, or a substituted alkylammonium group.)

[Chem. 4]

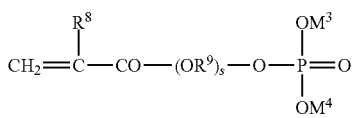

(In the general formula (II-3), $R^8$ represents a hydrogen atom or a methyl group; $R^9$ represents an alkylene group having 2 to 12 carbon atoms; s represents a number of 1 to 30; and $M^3$ and $M^4$ each represent a hydrogen atom, an alkali metal, an alkaline earth metal, an ammonium group, an alkylammonium group, or a substituted alkylammonium group.)

Advantageous Effects of Invention

According to the present invention, there can be provided the following shrinkage-reducing agent for a hydraulic material and shrinkage-reducing agent composition for a hydraulic material each having high general-purpose property. Each of the agent and the composition does not require a combination with any other admixture, is inexpensive, suppresses a reduction in strength of a cured article, suppresses the generation of a crack in a cured concrete body by virtue of its excellent shrinkage-reducing function, and shows such good compatibility with a water-reducing agent as to impart an excellent water-reducing function. Further, each of the agent and the composition can improve the quality of entrained air with an antifoaming agent and an AE agent so easily as to be capable of imparting excellent freezing-thawing resistance to the cured concrete body to improve the durability of the cured concrete body.

DESCRIPTION OF EMBODIMENTS

<<Shrinkage-reducing Agent for Hydraulic Material>>

A shrinkage-reducing agent for a hydraulic material of the present invention includes a compound represented by the general formula (1).

$$R^1\text{—}[O\text{-}(A^1O)_m\text{—}R^2]_n \qquad (1).$$

In the general formula (1), $R^1$ represents $R^1$ derived from a polyhydric alcohol represented by $R^1\text{—}[OH]_n$.

In the general formula (1), n represents 3 or 4. That is, when n equals 3, the polyhydric alcohol represented by $R^1\text{—}[OH]_n$ is a polyhydric alcohol having three hydroxyl groups (trihydric alcohol: $R^1\text{—}[OH]_3$) while, when n equals 4, the polyhydric alcohol represented by $R^1\text{—}[OH]_n$ is a polyhydric alcohol having four hydroxyl groups (tetrahydric alcohol: $R^1\text{—}[OH]_4$).

Specific examples of the above-mentioned trihydric alcohol include trimethylolalkanes such as trimethylolethane and trimethylolpropane, and 1,3,5-pentatriol. Of those, a trimethylolalkane is preferred, and trimethylolpropane is more preferred.

Specific examples of the above-mentioned tetrahydric alcohol include pentaerythritol.

In the general formula (1), when n equals 3, $R^1$ represents preferably a hydrocarbon group having 1 to 30 carbon atoms, more preferably a hydrocarbon group having 1 to 15 carbon atoms, still more preferably a hydrocarbon group having 1 to 10 carbon atoms, particularly preferably a hydrocarbon group having 1 to 6 carbon atoms.

In the general formula (1), when n equals 4, $R^1$ represents preferably a hydrocarbon group having 1 to 30 carbon atoms, more preferably a hydrocarbon group having 1 to 15 carbon atoms, still more preferably a hydrocarbon group having 1 to 10 carbon atoms, particularly preferably a hydrocarbon group having 1 to 6 carbon atoms.

In the general formula (1), $A^1O$ represents an oxyalkylene group having 2 to 18 carbon atoms. $A^1O$ preferably represents an oxyalkylene group having 2 to 4 carbon atoms. Specific examples of such group include an oxyethylene group, an oxypropylene group, and an oxybutylene group. When the number of carbon atoms of $A^1O$ is excessively large, the solubility of the shrinkage-reducing agent for a hydraulic material of the present invention in water may reduce.

In the general formula (1), the $A^1O$'s may be formed only of one kind of an oxyalkylene group, or may be formed of two or more kinds of oxyalkylene groups. When the $A^1O$'s are formed of two or more kinds of oxyalkylene groups, the groups may be a random adduct, may be a block adduct, or may be an alternate adduct.

In the general formula (1), oxyethylene groups preferably account for 50 mol % or more of the $A^1O$'s. The oxyethylene groups more preferably account for 60 to 100 mol % of the $A^1O$'s. The oxyethylene groups still more preferably account for 80 to 100 mol % of the $A^1O$'s. The oxyethylene groups particularly preferably account for 90 to 100 mol % of the $A^1O$'s.

In the general formula (1), m represents the average added mole number of oxyalkylene groups $A^1O$'s. When n equals 3, m represents 30 to 150 while, when n equals 4, m represents 5 to 150. Controlling m within the above-mentioned range allows the shrinkage-reducing agent for a hydraulic material of the present invention not only to suppress a reduction in strength of a cured article but also to exert an excellent shrinkage-reducing function.

In the general formula (1), $R^2$ preferably represents a hydrogen atom or a hydrocarbon group having 1 to 30 carbon atoms. $R^2$ represents more preferably a hydrogen atom or a hydrocarbon group having 1 to 15 carbon atoms, still more preferably a hydrogen atom or a hydrocarbon group having 1 to 10 carbon atoms, particularly preferably a hydrogen atom or a hydrocarbon group having 1 to 6 carbon atoms.

With regard to the molecular weight of the shrinkage-reducing agent for a hydraulic material of the present invention, its weight-average molecular weight (Mw) in terms of polyethylene glycol by gel permeation chromatography (hereinafter referred to as "GPC") is preferably 500 to 500,000, more preferably 1,000 to 300,000, still more preferably 5,000 to 200,000, particularly preferably 8,000 to 100,000. When the weight-average molecular weight (Mw) is less than 500, the shrinkage-reducing performance of the additive for a hydraulic material of the present invention may reduce. When the weight-average molecular weight (Mw) exceeds 500,000, the water-reducing performance and shrinkage-reducing performance of the additive for a hydraulic material of the present invention may reduce. It should be noted that the weight-average molecular weight in the description is a value measured under the following measurement conditions by GPC.

[Conditions for Measurement of Molecular Weight by GPC]

Columns used: TSKguardcolumn SWXL+TSKgel G4000SWXL+G3000SWXL+G2000SWXL manufactured by TOSOH CORPORATION Eluent: Used is an eluent solution that is prepared by dissolving 115.6 g of sodium acetate trihydrate in a mixed solvent of 10,999 g of water and 6,001 g of acetonitrile, and whose pH is adjusted to 6.0 with a 30% aqueous solution of sodium hydroxide.

Driving amount: 100 μL of the 0.5% eluent solution

Eluent flow rate: 0.8 mL/min

Column temperature: 40° C.

Standard substances: Polyethylene glycols each having a weight-average molecular weight (Mw) of 272,500, 219,300, 85,000, 46,000, 24,000, 12,600, 4,250, 7,100, or 1,470

Calibration curve order: A cubic polynomial

Detector: A differential refractive index detector 410 manufactured by Nihon Waters K.K.

Analytical software: A MILLENNIUM Ver. 3.21 manufactured by Nihon Waters K.K.

The shrinkage-reducing agent for a hydraulic material of the present invention may be used in combination with a water-reducing agent. The water-reducing agents may be used alone or in combination.

Any appropriate water-reducing agent may be adopted as the water-reducing agent which may be used in combination with the shrinkage-reducing agent for a hydraulic material of the present invention. Examples thereof include: lignosulfonates; polyol derivatives; naphthalene sulfonic acid-formalin condensate; melamine sulfonic acid-formalin condensate; polystyrene sulfonates; sulfonates such as amino sulfonic acid-based ones including aminoarylsulfonic acid-phenol-formaldehyde condensates (see JP 01-113419 A), and polymers each having a polyoxyalkylene group and an anionic group, such as a copolymer obtained from an alkenyl ether-based monomer in which a certain unsaturated alcohol such as 3-methyl-3-buten-1-ol has added thereto ethylene oxide or the like, an unsaturated carboxylic acid-based monomer, and a monomer copolymerizable with these monomers, or a salt thereof (see JP 62-68808 A, JP 10-236858 A, and JP 2001-220417 A); a copolymer formed of polyethylene(propylene) glycol(meth)acrylate or polyethylene(propylene)glycol mono(meth)allyl ether, (meth)allyl sulfonic acid (salt), and (meth)acrylic acid (salt) (see JP 62-216950 A); a copolymer formed of polyethylene(propylene)glycol(meth)acrylate, (meth)allyl sulfonic acid (salt), and (meth)acrylic acid (salt) (see JP 01-226757 A); a copolymer of polyethylene glycol mono(meth)allyl ether and maleic acid (salt) (see JP 04-149056 A); a copolymer formed of polyethylene glycol mono(meth)allyl ether, polyethylene glycol mono(meth)acrylate, an alkyl(meth)acrylate, (meth)acrylic acid (salt), (meth)allyl sulfonic acid (salt), or p-(meth)allyloxybenzene sulfonic acid (salt) (see JP 06-191918 A); a copolymer of an alkoxy polyalkylene glycol monoallyl ether and maleic anhydride, or a hydrolysate thereof, or a salt thereof (see JP 05-43288 A); a copolymer formed of a polyalkylene glycol mono(meth)acrylate-based monomer, a (meth)acrylic acid-based monomer, and a monomer copolymerizable with these monomers (see JP 59-18338 B); a copolymer formed of a (meth)acrylic acid ester having a sulfonic acid group and optionally a monomer copolymerizable with the ester, or a salt thereof (see JP 62-119147 B); an esterification reaction product of a copolymer of an alkoxy polyalkylene glycol monoallyl ether and maleic anhydride, and a polyoxyalkylene derivative having a hydroxyl group at its terminal (see JP 06-298555 A); a copolymer of a polyalkylene glycol monoester-based monomer and one or more kinds of monomers selected from a (meth)acrylic acid-based monomer, an unsaturated dicarboxylic acid-based monomer, and a (meth) allyl sulfonic acid-based monomer (see JP 07-223852 A); a copolymer formed of one or more kinds of monomers selected from styrene sulfonic acid, a sulfoalkyl(meth)acrylate, 2-acrylamido-2-methylpropanesulfonic acid, and a hydroxyalkyl(meth)acrylate monophosphate, an (alkoxy) polyalkylene glycol mono(meth)acrylate, and an unsaturated carboxylic acid-based monomer, or a salt thereof (see JP 11-79811 A); a copolymer of an (alkoxy)polyalkylene glycol monovinyl ether-based monomer, an unsaturated carboxylic acid-based monomer, and a (hydroxy)alkyl(meth)acrylate (see JP 2004-307590 A); a copolymer formed of an (alkoxy) polyalkylene glycol mono(meth)acrylate, a phosphoric acid monoester-based monomer, and a phosphoric acid diester-based monomer, or a salt thereof (see JP 2006-52381 A); and a copolymer of an unsaturated (poly)alkylene glycol ether-based monomer and an unsaturated monocarboxylic acid-based monomer (see JP 2002-121055 A and JP 2002-121056 A). Of those, preferred are: lignosulfonates; polyol derivatives; naphthalene sulfonic acid-formalin condensate; a copolymer obtained from an alkenyl ether-based monomer in which a certain unsaturated alcohol such as 3-methyl-3-buten-1-ol has added thereto ethylene oxide or the like, an unsaturated carboxylic acid-based monomer, and a monomer copolymerizable with these monomers, or a salt thereof (see JP 62-68808 A, JP 10-236858 A, and JP 2001-220417 A); a copolymer of polyethylene glycol mono(meth)allyl ether and maleic acid (salt) (see JP 04-149056A); a copolymer of an alkoxy polyalkylene glycol monoallyl ether and maleic anhydride, or a hydrolysate thereof, or a salt thereof (see JP 05-43288 A); a copolymer formed of a polyalkylene glycol mono(meth)acrylate-based monomer, a (meth)acrylic acid-based monomer, and a monomer copolymerizable with these monomers (see JP 59-18338 B); a copolymer of a polyalkylene glycol monoester-based monomer and one or more kinds of monomers selected from a (meth)acrylic acid-based monomer, an unsaturated dicarboxylic acid-based monomer and a (meth)allyl sulfonic acid-based monomer (see JP 07-223852 A); a copolymer of an (alkoxy)polyalkylene glycol monovinyl ether-based monomer, an unsaturated carboxylic acid-based monomer, and a (hydroxy)alkyl(meth)acrylate (see JP 2004-307590 A); a copolymer formed of an (alkoxy)polyalkylene glycol mono(meth)acrylate, a phosphoric acid monoester-based monomer, and a phosphoric acid diester-based monomer, or a salt thereof (see JP 2006-52381 A); and a copolymer of an unsaturated (poly)alkylene glycol ether-based monomer and an unsaturated monocarboxylic acid-based monomer (see JP 2002-121055 A and JP 2002-121056 A).

The shrinkage-reducing agent for a hydraulic material of the present invention may be used in combination with an AE agent or an antifoaming agent. The AE agents and antifoaming agents may be used alone or in combination.

Any appropriate AE agent may be adopted as the AE agent which may be used in combination with the shrinkage-reducing agent for a hydraulic material of the present invention. Examples thereof include resin soaps, saturated or unsaturated fatty acids, sodium hydroxystearate, lauryl sulfate, alkylbenzenesulfonates (ABSs), linear alkylbenzenesulfonates (LASs), alkanesulfonates, polyoxyethylene alkyl(phenyl) ethers, polyoxyethylene alkyl(phenyl)ether sulfuric acid esters or salts thereof, polyoxyethylene alkyl(phenyl)ether phosphoric acid esters or salts thereof, proteinic materials, alkenylsulfosuccinates, and α-olefin sulfonates.

Any appropriate antifoaming agent can be adopted as the antifoaming agent that can be used in combination with the shrinkage-reducing agent for a hydraulic material of the present invention. Examples thereof include:
(1) mineral oil-based antifoaming agents such as kerosene and liquid paraffin;
(2) fat and oil-based antifoaming agents such as animal or vegetable oils, sesame oil, castor oil, and alkylene oxide adducts thereof;
(3) fatty acid-based antifoaming agents such as oleic acid, stearic acid, and alkylene oxide adducts thereof;
(4) fatty acid ester-based antifoaming agents such as glycerin monoricinoleate, alkenyl succinic acid derivatives, sorbitol monolaurate, sorbitol trioleate, and natural waxes;
(5) oxyalkylene-based antifoaming agents such as: polyoxyalkylenes such as (poly)oxyethylene(poly)oxypropylene adducts; (poly)oxyalkyl ethers such as diethylene glycol heptyl ether, polyoxyethylene oleyl ether, polyoxypropylene butyl ether, polyoxyethylene polyoxypropylene 2-ethylhexyl ether, and oxyethylene oxypropylene adducts of higher alcohols each having 12 to 14 carbon atoms; (poly) oxyalkylene(alkyl)aryl ethers such as polyoxypropylene phenyl ether and polyoxyethylene nonyl phenyl ether; acetylene ethers each produced by addition polymerization of an alkylene oxide onto an acetylene alcohol such as 2,4,7,9-tetramethyl-5-decyne-4,7-diol, 2,5-dimethyl-3- hexyne-2,5-diol, and 3-methyl-1-butyn-3-ol; (poly)oxyalkylene fatty acid esters such as diethylene glycol oleate, diethylene glycol laurate, and ethylene glycol distearate; (poly)oxyalkylenesorbitan fatty acid esters such as polyoxyethylenesorbitan monolaurate and polyoxyethylenesorbitan trioleate; (poly)oxyalkylene alkyl(aryl)ether sulfuric acid ester salts such as polyoxypropylene methyl ether sulfate sodium salt and polyoxyethylene dodecylphenol ether sulfate sodium salt; (poly)oxyalkylene alkyl phosphoric acid esters such as (poly)oxyethylene stearyl phosphate; (poly)oxyalkylene alkylamines such as polyoxyethylene laurylamine; and polyoxyalkylene amides;

(6) alcohol-based antifoaming agents such as octyl alcohol, 2-ethylhexyl alcohol, hexadecyl alcohol, acetylene alcohols, and glycols;

(7) amide-based antifoaming agents such as acrylate polyamine;

(8) phosphoric acid ester-based antifoaming agents such as tributyl phosphate and sodium octyl phosphate;

(9) metal soap-based antifoaming agents such as aluminum stearate and calcium oleate; and

(10) silicone-based antifoaming agents such as dimethyl silicone oil, silicone paste, silicone emulsions, organically modified polysiloxanes (polyorganosiloxanes such as dimethylpolysiloxane), and fluorosilicone oil.

The shrinkage-reducing agent for a hydraulic material of the present invention may be used in combination with any other component as required as long as actions and effects of the present invention are exerted. Examples of the other component include a polyoxyalkylene derived from an oxyalkylene group as a by-product upon synthesis of the compound represented by the general formula (1), a water-soluble polymer substance, a polymer emulsion, a retardant, a high-early-strength agent/accelerator, a surfactant, a waterproof agent, a rust inhibitor, a crack-reducing agent, an expansive additive, a cement-wetting agent, a thickener, a segregation-reducing agent, a flocculant, any other drying shrinkage-reducing agent such as a polyalkylene glycol, a strength-enhancing agent, a self-leveling agent, a rust inhibitor, a colorant, an antifungal agent, blast-furnace slag, fly ash, cinder ash, clinker ash, husk ash, silica fume, a silica powder, and plaster. They may be used alone or in combination. However, there is no need to use such other admixtures as listed above unless otherwise required because the shrinkage-reducing agent for a hydraulic material of the present invention can exert such effects as described below. The agent does not require a combination with any other admixture, is inexpensive, suppresses a reduction in strength of a cured article, and has an excellent shrinkage-reducing function.

Any appropriate method can be adopted as a method of producing the shrinkage-reducing agent for a hydraulic material of the present invention. The agent is produced by, for example, a method involving causing an addition reaction between the above-mentioned polyhydric alcohol represented by $R^1-[OH]_n$ and an alkylene oxide having 2 to 18 carbon atoms in the presence of an alkali component (such as sodium hydroxide).

In addition, when 60 moles or more of the alkylene oxide are added, the agent is produced by, for example, a method including: an initial step (I) involving adding 5 moles or more of the alkylene oxide with respect to 1 mole of a hydroxyl group of the polyhydric alcohol to provide an alkylene oxide low-molar adduct that is in a liquid state at 25° C.; and an added mole number-adjusting step (II) involving adding, to the alkylene oxide low-molar adduct obtained in the initial step (I), 5 moles or more of the alkylene oxide with respect to 1 mole of a hydroxyl group of the alkylene oxide low-molar adduct.

The shrinkage-reducing agent for a hydraulic material of the present invention has excellent water solubility and excellent compatibility with the water-reducing agent as well as an excellent shrinkage-reducing function. As the shrinkage-reducing agent for a hydraulic material of the present invention can be dissolved together with water and the water-reducing agent at any appropriate ratio, a wide range of water/cement ratios is applicable, and even a concrete having a water/cement ratio (weight ratio) of preferably 60% to 15% can be produced. Therefore, the agent has high general-purpose property and can be used by being added to any one of the cement compositions for various applications.

A cement composition using the shrinkage-reducing agent for a hydraulic material of the present invention is preferably a composition obtained by adding the shrinkage-reducing agent for a hydraulic material of the present invention to a cement composition such as a mortar formed of a cement, a fine aggregate, and water, or a concrete formed of the mortar and a coarse aggregate at a predetermined ratio.

Examples of the cement used in the production of the cement composition include a normal, low-heat, moderate-heat, high-early-strength, ultra-high-early-strength, or sulfate-resistant Portland cement, a blast-furnace cement, a silica cement, a fly ash cement, an ecocement, and a silica fume cement. In addition, a powder in the cement composition is, for example, silica fume, fly ash, a limestone fine powder, a blast-furnace slag fine powder, an expansive additive, or any other mineral fine powder. Examples of the fine aggregate include river sand, mountain sand, sea sand, crushed sand, a heavy aggregate, a lightweight aggregate, a slag aggregate, and a recycled aggregate. Examples of the coarse aggregate include river gravel, a crushed stone, a heavy aggregate, a lightweight aggregate, a slag aggregate, and a recycled aggregate. Examples of the water include tap water described in JIS A 5308 Appendix 9, water except tap water (such as river water, lake water, or well water), and recycled water.

Any appropriate additive may be added to the cement composition. Examples of the additive include a hardening accelerator, a setting retarder, a rust inhibitor, a waterproof agent, and an antiseptic.

Any appropriate method can be adopted as a method of, for example, producing, conveying, pouring, curing, or managing the cement composition.

Any appropriate amount can be adopted as the addition amount of the shrinkage-reducing agent for a hydraulic material of the present invention in the cement composition depending on purposes. For example, the amount is preferably 0.5 to 10.0 wt % with respect to 100 parts by weight of the cement. In addition, when a cement volume per 100 parts by volume of the cement composition exceeds 14 vol %, the amount is preferably 0.5 to 10.0 wt %, more preferably 0.5 to 6.0 wt % with respect to 100 parts by weight of the cement.

<<Shrinkage-reducing Agent Composition for Hydraulic Material>>

The shrinkage-reducing agent composition for a hydraulic material of the present invention includes the following component A and component B.

Component A:

at least one kind selected from a compound represented by the general formula (1) and a polyalkyleneimine.

$$R^1-[O-(A^1O)_m-R^2]_n \tag{1}$$

(In the general formula (1), $R^1$ represents $R^1$ derived from a polyhydric alcohol represented by $R^1$—$[OH]_n$; $A^1O$ represents an oxyalkylene group having 2 to 18 carbon atoms; $R^2$ represents a hydrogen atom or a hydrocarbon group having 1 to 30 carbon atoms; m represents the average added mole number of oxyalkylene groups $A^1O$'s; n represents an integer of 3 or more; and when n equals 3, m represents 30 to 150, when n equals 4, m represents 5 to 450, and when n is equal to or more than 5, m represents 10 to 500.)

Component B:
a polyoxyalkylene-based polymer.

In the shrinkage-reducing agent composition for a hydraulic material of the present invention, a weight ratio "component A/component B" of the component A to the component B in terms of a solid content is 99.9/0.1 to 55/45. The ratio "component A/component B" is preferably 99.5/0.5 to 60/40. The ratio "component A/component B" is more preferably 99/1 to 60/40. The ratio "component A/component B" is still more preferably 98/2 to 70/30. Controlling the ratio of the component A to the component B within the above-mentioned range can provide a shrinkage-reducing agent composition for a hydraulic material having high general-purpose property which does not require a combination with any other admixture, is inexpensive, suppresses a reduction in strength of a cured article, and brings together an excellent shrinkage-reducing function and an excellent water-reducing function.

The shrinkage-reducing agent composition for a hydraulic material of the present invention may be formed only of the component A and the component B, or may contain any other appropriate component to such an extent that the effects of the present invention are not impaired. The other component is, for example, water. The ratio of the total amount of the component A and the component B in the shrinkage-reducing agent composition for a hydraulic material of the present invention may vary depending on the kind of the above-mentioned other appropriate component. The ratio is appropriately set depending on, for example, the extent to which the component A and the component B are compatible with each other, and a condition under, and an object for, which each of the components is used. Only one kind of the component A may be used, or two or more kinds of the components A may be used in combination. Only one kind of the component B may be used, or two or more kinds of the components B may be used in combination. The shrinkage-reducing agent composition for a hydraulic material of the present invention has only to be prepared by any appropriate method. For example, the component A and the component B, and the other appropriate component have only to be mixed by any appropriate method.

In the shrinkage-reducing agent composition for a hydraulic material of the present invention, the component A is at least one kind selected from a compound represented by the general formula (1) and a polyalkyleneimine.

$$R^1\text{—}[O\text{-}(A^1O)_m\text{—}R^2]_n \quad (1)$$

Examples of the above-mentioned polyalkyleneimine include the following polyalkyleneimines (a) to (c).

(a) Homopolymers and copolymers of ethyleneimine, propyleneimine, 1,2-butyleneimine, 2,3-butyleneimine, and 1,1-dimethylethyleneimine. Of those, a homopolymer of ethyleneimine and a copolymer of ethyleneimine and propyleneimine are particularly preferred.

(b) A polyalkyleneimine having a polyether chain obtained by addition polymerization of an alkylene oxide onto an amino group containing active hydrogen, the amino group being included in the polyalkyleneimine described in the above-mentioned item (a). Of such polyalkyleneimines, a polyalkyleneimine having a polyether chain obtained by addition polymerization of an alkylene oxide in an amount exceeding the equivalent amount of the active hydrogen of the above-mentioned amino group is particularly preferred. As the above-mentioned polyalkyleneimine, polyethyleneimine is preferred. As the above-mentioned alkylene oxide, ethylene oxide is preferred.

(c) A polyalkyleneimine having a carboxyl group or an ester group obtained by Michael addition of
(i) an unsaturated carboxylic acid such as acrylic acid, methacrylic acid, maleic acid, or fumaric acid,
(ii) a mono- or diester of the above-mentioned carboxylic acid with an alcohol having 1 to 20 carbon atoms, or
(iii) a mono- or diester of the above-mentioned carboxylic acid with an alkoxy(poly)alkylene glycol obtained by adding 1 to 300 moles of an alkylene oxide having 2 to 4 carbon atoms onto an alcohol having 1 to 30 carbon atoms onto part or all of the nitrogen atoms included in the polyalkyleneimine described in the above-mentioned item (a). As the above-mentioned unsaturated carboxylic acid, acrylic acid, methacrylic acid, or maleic acid is preferred. As the polyalkyleneimine described in the above-mentioned item (a), polyethyleneimine is preferred.

The weight average molecular weight of the above-mentioned polyalkyleneimine is preferably 300 to 500,000, more preferably 500 to 100,000, still more preferably 600 to 10,000.

Amines may be used as the above-mentioned component A. Examples of such amines include:
(i) a (poly)alkylene polyamine such as ethylenediamine, diethylenetriamine, triethylenetetramine, tetraethylenepentamine, or pentaethylenehexamine; and a (poly)alkylene polyamine having a polyether chain obtained by addition polymerization of an alkylene oxide onto an amino group containing active hydrogen, the amino group being included in each of those (poly)alkylene polyamines;
(ii) a polyamide polyamine obtained by condensation of a polyalkyleneimine and/or a polyalkylene polyamine with a polybasic acid such as sulfuric acid, phosphoric acid, or adipic acid; a polyurea polyamine obtained by condensation of a polyalkyleneimine and/or an alkyleneimine with urea; a polyamide polyester polyamine obtained by copolymerization of an alkyleneimine with an acid anhydride such as phthalic anhydride; a polyallylamine obtained by polymerization of an allylamine, a diallylamine, and/or hydrochlorides thereof; a polydiallylamine-sulfur dioxide copolymer obtained by copolymerization of a diallylamine and/or a hydrochloride thereof with sulfur dioxide; a diallylamine-maleic acid copolymer obtained by copolymerization of a diallylamine and/or a hydrochloride thereof with maleic acid; a polyamide polyamine, a polyurea polyamine, a polyamide polyester polyamine, a polydiallylamine-sulfur dioxide copolymer, and a diallylamine-maleic acid copolymer each having a polyether chain obtained by addition polymerization of an alkylene oxide onto an amino group containing active hydrogen, the amino group being included in each of those copolymers;
(iii) a primary amine having linear or branched alkyl group having 1 to 12 carbon atoms, such as (di)methylamine, (di)ethylamine, (di)propylamine, (di)butylamine, (di)pentylamine, (di)hexylamine, (di)heptylamine, (di)octylamine, (di)nonylamine, (di)decaamine, (di)undecaamine, or (di)dodecaamine; secondary amines in each of which different kinds of alkyl groups are mixed; primary or secondary amines each having an aromatic group having a benzene ring and having 6 to 12 carbon atoms, such as a phenyl group, an alkylphenyl group, a phenylalkyl group, a phenyl group substituted with an (alkyl)phenyl group, or a naphthyl group, an alkenyl group having 2 to 12 carbon atoms, or an alkynyl group having 2 to 12 carbon atoms; and amines each having a polyether chain obtained by addition polymerization of an alkylene oxide onto an amino group and/or hydroxyl group containing active hydrogen, the group(s) being included in an alkanolamine such as N-methyl(di)ethanolamine, N-ethyl(di)ethanolamine, N-propyl(di)ethanolamine, N-butyl(di)ethanolamine, monoethanolamine, diethanolamine, or triethanolamine.

In the compound represented by the general formula (1), $R^1$ represents $R^1$ derived from a polyhydric alcohol represented by $R^1$—$[OH]_n$.

In the general formula (1), n represents an integer of 3 or more. That is, when n equals 3, the polyhydric alcohol represented by $R^1$—$[OH]_n$ is a polyhydric alcohol having three hydroxyl groups (trihydric alcohol: $R^1$—$[OH]_3$), when n equals 4, the polyhydric alcohol represented by $R^1$—$[OH]_n$ is a polyhydric alcohol having four hydroxyl groups (tetrahydric alcohol: $R^1$—$[OH]_4$), and when n is equal to or more than 5, the polyhydric alcohol represented by $R^1$—$[OH]_n$ is a polyhydric alcohol having five or more hydroxyl groups.

Specific examples of the above-mentioned trihydric alcohol include trimethylolalkanes such as trimethylolethane and trimethylolpropane, and 1,3,5-pentatriol. Of those, a trimethylolalkane is preferred, and trimethylolpropane is more preferred.

Specific examples of the above-mentioned tetrahydric alcohol include erythritol and pentaerythritol. The above-mentioned tetrahydric alcohol is preferably pentaerythritol.

Specific examples of the above-mentioned polyhydric alcohol having five or more hydroxyl groups include dipentaerythritol, sorbitol, sorbitan, sorbitol-glycerin condensate, adonitol, arabitol, xylitol, mannitol, and polyglycerin. Further, there are given as saccharides: saccharides as hexoses such as glucose, fructose, mannose, indose, sorbose, gulose, talose, tagatose, galactose, allose, psicose, and altrose; saccharides as pentoses such as arabinose, ribulose, ribose, xylose, xylulose, and lyxose; saccharides as tetroses such as threose, erythrulose, and erythrose; and other saccharides such as rhamnose, cellobiose, maltose, etose, isomaltose, trehalose, sucrose, raffinose, gentianose, and melezitose. Of those, dipentaerythritol, sorbitol, sorbitan, and polyglycerin are preferred. The above-mentioned polyhydric alcohol having five or more hydroxyl groups is preferably dipentaerythritol, sorbitol, sorbitan, sorbitol-glycerin condensate, or polyglycerin, more preferably dipentaerythritol, sorbitol, or polyglycerin.

In the general formula (1), $A^1O$ represents an oxyalkylene group having 2 to 18 carbon atoms. $A^1O$ preferably represents an oxyalkylene group having 2 to 4 carbon atoms. Specific examples of such group include an oxyethylene group, an oxypropylene group, and an oxybutylene group. When the number of carbon atoms of $A^1O$ is excessively large, the solubility of the shrinkage-reducing agent for a hydraulic material of the present invention in water may reduce.

In the general formula (1), the $A^1O$'s may be formed only of one kind of an oxyalkylene group, or may be formed of two or more kinds of oxyalkylene groups. When the $A^1O$'s are formed of two or more kinds of oxyalkylene groups, the groups may be a random adduct, may be a block adduct, or may be an alternate adduct.

In the general formula (1), oxyalkylene groups each having 2 or 3 carbon atoms preferably account for 50 mol % or more of the $A^1O$'s. The oxyalkylene groups each having 2 or 3 carbon atoms more preferably account for 60 to 100 mol % of the $A^1O$'s. The oxyalkylene groups each having 2 or 3 carbon atoms still more preferably account for 80 to 100 mol % of the $A^1O$'s. The oxyalkylene groups each having 2 or 3 carbon atoms particularly preferably account for 90 to 100 mol % of the $A^1O$'s. In a more preferred embodiment, in the general formula (1), oxyalkylene groups each having 2 carbon atoms (oxyethylene groups) preferably account for 50 mol % or more of the $A^1O$'s. The oxyalkylene groups each having 2 carbon atoms (oxyethylene groups) more preferably account for 60 to 100 mol % of the $A^1O$'s. The oxyalkylene groups each having 2 carbon atoms (oxyethylene groups) still more preferably account for 80 to 100 mol % of the $A^1O$'s. The oxyalkylene groups each having 2 carbon atoms (oxyethylene groups) particularly preferably account for 90 to 100 mol % of the $A^1O$'s.

In the general formula (1), m represents the average added mole number of oxyalkylene groups $A^1O$'s.

When n equals 3, m represents 30 to 150, m preferably represents 30 to 120, and m more preferably represents 30 to 90. Controlling m within the above-mentioned range allows the shrinkage-reducing agent composition for a hydraulic material of the present invention not only to suppress a reduction in strength of a cured article but also to exert an excellent shrinkage-reducing function.

When n equals 4, m represents 5 to 450, m preferably represents 5 to 200, m more preferably represents 5 to 150, m still more preferably represents 5 to 100, and m particularly preferably represents 10 to 50. Controlling m within the above-mentioned range allows the shrinkage-reducing agent composition for a hydraulic material of the present invention not only to suppress a reduction in strength of a cured article but also to exert an excellent shrinkage-reducing function.

When n is equal to or more than 5, m represents 10 to 500, m preferably represents 10 to 250, more preferably represents 10 to 100. Controlling m within the above-mentioned range allows the shrinkage-reducing agent composition for a hydraulic material of the present invention not only to suppress a reduction in strength of a cured article but also to exert an excellent shrinkage-reducing function.

In the general formula (1), $R^2$ preferably represents a hydrogen atom or a hydrocarbon group having 1 to 30 carbon atoms. $R^2$ represents more preferably a hydrogen atom or a hydrocarbon group having 1 to 15 carbon atoms, still more preferably a hydrogen atom or a hydrocarbon group having 1 to 10 carbon atoms, particularly preferably a hydrogen atom or a hydrocarbon group having 1 to 6 carbon atoms.

With regard to the molecular weight of the compound represented by the general formula (1), its weight-average molecular weight (Mw) in terms of polyethylene glycol by gel permeation chromatography (hereinafter referred to as "GPC") is preferably 500 to 500,000, more preferably 1,000 to 300,000, still more preferably 1,000 to 200,000, particularly preferably 1,500 to 100,000. When the weight-average molecular weight (Mw) is less than 500, the shrinkage-reducing performance of the shrinkage-reducing agent composition for a hydraulic material of the present invention may reduce. When the weight-average molecular weight (Mw) exceeds 500,000, the water-reducing performance and shrinkage-reducing performance of the shrinkage-reducing agent composition for a hydraulic material of the present invention may reduce. It should be noted that the weight-average molecular weight in the description is a value measured under the following measurement conditions by GPC.

[Conditions for Measurement of Molecular Weight by GPC]
Columns used: TSKguardcolumn SWXL+TSKgel G4000SWXL+G3000SWXL+G2000SWXL manufactured by TOSOH CORPORATION Eluent: Used is an eluent solution that is prepared by dissolving 115.6 g of sodium acetate trihydrate in a mixed solvent of 10,999 g of water and 6,001 g of acetonitrile, and whose pH is adjusted to 6.0 with a 30% aqueous solution of sodium hydroxide.

Driving amount: 100 μL of the 0.5% eluent solution

Eluent flow rate: 0.8 mL/min

Column temperature: 40° C.

Standard substances: Polyethylene glycols each having a weight-average molecular weight (Mw) of 272,500, 219, 300, 85,000, 46,000, 24,000, 12,600, 4,250, 7,100, or 1,470

Calibration curve order: A cubic polynomial

Detector: A differential refractive index detector 410 manufactured by Nihon Waters K.K.

Analytical software: A MILLENNIUM Ver. 3.21 manufactured by Nihon Waters K.K.

Specifically, the compound represented by the general formula (1) is preferably, for example, at least one kind selected from trimethylolalkane alkylene oxide adducts, pentatriol alkylene oxide adducts, and alkylene oxide adducts of polyhydric alcohols each having four or more hydroxyl groups. More specifically, the compound represented by the general formula (1) is preferably at least one kind selected from alkylene oxide adducts of polyhydric alcohols obtained by adding alkylene oxides to trimethylolethane, trimethylolpropane, 1,3,5-pentatriol, erythritol, pentaerythritol, dipentaerythritol, sorbitol, and polyglycerin. This is because the effects of the present invention are sufficiently expressed.

In the shrinkage-reducing agent composition for a hydraulic material of the present invention, the component B is a polyoxyalkylene-based polymer.

In the shrinkage-reducing agent composition for a hydraulic material of the present invention, the polyoxyalkylene-based polymer as the component B is a polymer having a polyoxyalkylene group.

The polyoxyalkylene group is preferably such a group that oxyalkylene groups each having 2 to 18 carbon atoms are added at an average added mole number of 2 to 300.

When the polyoxyalkylene-based polymer is adopted as the component B, the shrinkage-reducing agent composition for a hydraulic material obtained by combining the polymer with the component A can not only suppress a reduction in strength of a cured article but also exert an excellent shrinkage-reducing function.

The component B may be only one kind of a polyoxyalkylene-based polymer, or may be a mixture of two or more kinds of polyoxyalkylene-based polymers.

With regard to the molecular weight of the polyoxyalkylene-based polymer as the component B, its weight-average molecular weight (Mw) in terms of polyethylene glycol by gel permeation chromatography (hereinafter referred to as "GPC") is preferably 500 to 500,000, more preferably 1,000 to 300,000, still more preferably 5,000 to 200,000, particularly preferably 8,000 to 100,000.

When the weight-average molecular weight (Mw) of the component B is less than 500, the water-reducing performance of the shrinkage-reducing agent composition for a hydraulic material of the present invention may reduce. When the weight-average molecular weight (Mw) of the component B exceeds 500,000, the water-reducing performance and slump-loss preventing performance of the shrinkage-reducing agent composition for a hydraulic material of the present invention may reduce. It should be noted that the weight-average molecular weight in the description is a value measured under the following measurement conditions by GPC.

[Conditions for Measurement of Molecular Weight by GPC]

Columns used: TSKguardcolumn SWXL+TSKgel G4000SWXL+G3000SWXL+G2000SWXL manufactured by TOSOH CORPORATION Eluent: Used is an eluent solution that is prepared by dissolving 115.6 g of sodium acetate trihydrate in a mixed solvent of 10,999 g of water and 6,001 g of acetonitrile, and whose pH is adjusted to 6.0 with a 30% aqueous solution of sodium hydroxide.

Driving amount: 100 μL of the 0.5% eluent solution

Eluent flow rate: 0.8 mL/min

Column temperature: 40° C.

Standard substances: Polyethylene glycols each having a weight-average molecular weight (Mw) of 272,500, 219, 300, 85,000, 46,000, 24,000, 12,600, 4,250, 7,100, or 1,470

Calibration curve order: A cubic polynomial

Detector: A differential refractive index detector 410 manufactured by Nihon Waters K.K.

Analytical software: A MILLENNIUM Ver. 3.21 manufactured by Nihon Waters K.K.

The above-mentioned polyoxyalkylene-based polymer is preferably a polymer having a polyoxyalkylene group and an anionic group. The anionic group is preferably any one of a carboxyl group, a sulfonic group, and a phosphate group because a shrinkage-reducing agent composition for a hydraulic material that brings together an excellent shrinkage-reducing function and an excellent water-reducing function can be provided.

Specific examples of the above-mentioned polyoxyalkylene-based polymer include:

a copolymer obtained from an alkenyl ether-based monomer in which a certain unsaturated alcohol such as 3-methyl-3-buten-1-ol has added thereto ethylene oxide or the like, an unsaturated carboxylic acid-based monomer, and a monomer copolymerizable with these monomers, and/or a salt thereof (see JP 62-68806 A, JP 10-236858 A, and JP 2001-220417 A);

a copolymer obtained from polyethylene(propylene)glycol (meth)acrylate or polyethylene(propylene)glycol mono(meth)allyl ether, (meth)allyl sulfonic acid (salt), and (meth)acrylic acid (salt) (see JP 62-216950 A);

a copolymer obtained from polyethylene(propylene)glycol (meth)acrylate, (meth)allyl sulfonic acid (salt), and (meth) acrylic acid (salt) (see JP 01-226757 A);

a copolymer of polyethylene glycol mono(meth)allyl ether and maleic acid (salt) (see JP 04-149056 A);

a copolymer obtained from polyethylene glycol mono(meth)) allyl ether, polyethylene glycol mono(meth)acrylate, an alkyl(meth)acrylate, (meth)acrylic acid (salt), (meth)allyl sulfonic acid (salt), or p-(meth)allyloxybenzene sulfonic acid (salt) (see JP 06-191918 A);

a copolymer of an alkoxy polyalkylene glycol monoallyl ether and maleic anhydride, or a hydrolysate thereof, or a salt thereof (see JP 05-43288 A);

a copolymer obtained from a polyalkylene glycol mono (meth)acrylate-based monomer, a (meth)acrylic acid-based monomer, and a monomer copolymerizable with these monomers (see JP 59-18338 B);

a copolymer obtained from a (meth))acrylic acid ester having a sulfonic acid group and optionally a monomer copolymerizable with the ester, or a salt thereof (see JP 62-119147 B);

an esterification reaction product of a copolymer of an alkoxy polyalkylene glycol monoallyl ether and maleic anhydride, and a polyoxyalkylene derivative having a hydroxyl group at its terminal (see JP 06-298555 A);

a copolymer obtained from a polyalkylene glycol monoester-based monomer and one or more kinds of monomers selected from a (meth)acrylic acid-based monomer, an unsaturated dicarboxylic acid-based monomer, and a (meth)allyl sulfonic acid-based monomer (see JP 07-223852 A);

a copolymer obtained from one or more kinds of monomers selected from styrene sulfonic acid, a sulfoalkyl(meth) acrylate, 2-acrylamido-2-methylpropanesulfonic acid, and a hydroxyalkyl(meth)acrylate monophosphate, an (alkoxy)polyalkylene glycol mono(meth)acrylate, and an unsaturated carboxylic acid-based monomer, or a salt thereof (see JP 11-79811 A);

a copolymer obtained from an (alkoxy)polyalkylene glycol monovinyl ether-based monomer, an unsaturated carboxylic acid-based monomer, and a (hydroxy)alkyl(meth)acrylate (see JP 2004-307590 A);

a copolymer obtained from an (alkoxy)polyalkylene glycol mono(meth)acrylate, a phosphoric acid monoester-based monomer, and a phosphoric acid diester-based monomer, or a salt thereof (see JP 2006-52381 A); and a copolymer of an unsaturated (poly)alkylene glycol ether-based monomer and an unsaturated monocarboxylic acid-based monomer (see JP 2002-121055 A and JP 2002-121056 A).

Of those specific examples of the above-mentioned polyoxyalkylene-based polymer, preferred are: a copolymer obtained from an alkenyl ether-based monomer in which a certain unsaturated alcohol such as 3-methyl-3-buten-1-ol has added thereto ethylene oxide or the like, an unsaturated carboxylic acid-based monomer, and a monomer copolymerizable with these monomers, and/or a salt thereof (see JP 62-68806A, JP 10-236858 A, and JP 2001-220417 A); a copolymer of polyethylene glycol mono(meth)allyl ether and maleic acid (salt) (see JP 04-149056A); a copolymer of an alkoxy polyalkylene glycol monoallyl ether and maleic anhydride, or a hydrolysate thereof, or a salt thereof (see JP 05-43288 A); a copolymer obtained from a polyalkylene glycol mono(meth)acrylate-based monomer, a (meth)acrylic acid-based monomer, and a monomer copolymerizable with these monomers (see JP 59-18338 B); a copolymer obtained from a polyalkylene glycol monoester-based monomer and one or more kinds of monomers selected from a (meth)acrylic acid-based monomer, an unsaturated dicarboxylic acid-based monomer, and a (meth)allyl sulfonic acid-based monomer (see JP 07-223852A); a copolymer obtained from an (alkoxy) polyalkylene glycol monovinyl ether-based monomer, an unsaturated carboxylic acid-based monomer, and a (hydroxy) alkyl(meth)acrylate (see JP 2004-307590 A); a copolymer obtained from an (alkoxy)polyalkylene glycol mono(meth) acrylate, a phosphoric acid monoester-based monomer, and a phosphoric acid diester-based monomer, or a salt thereof (see JP 2006-52381 A); and a copolymer of an unsaturated (poly) alkylene glycol ether-based monomer and an unsaturated monocarboxylic acid-based monomer (see JP 2002-121055 A and JP 2002-121056 A).

The above-mentioned polyoxyalkylene-based polymer is particularly preferably a copolymer obtained by copolymerizing the monomer (I) having a polyoxyalkylene group represented by the above-mentioned general formula (I) and at least one kind of the monomer (II) selected from the monomers each represented by the above-mentioned general formula (II-1), (II-2), or (II-3).

In the monomer (I), $R^3$ in the above-mentioned general formula (I) preferably represents a hydrogen atom, the oxyalkylene groups AO's are preferably formed of oxyalkylene groups each having 2 to 4 carbon atoms, the oxyalkylene groups AO's more preferably contain oxyethylene groups, and the content of the oxyethylene groups with respect to the entirety of the oxyalkylene groups AO's is more preferably 70 mol % or more, still more preferably 80 mol % or more, particularly preferably 90 mol % or more. The oxyethylene groups most preferably account for the entirety of the oxyalkylene groups AO's. When p equals 0, the oxyalkylene groups AO's form an ether bond with $(CH_2)_q$. When p equals 1, the groups form an ester bond with $(CH_2)_m$. p preferably equals 1. m represents a number of 0 to 2, and m preferably equals 0. In addition, $R^4$ represents preferably a hydrogen atom or a hydrocarbon group having 1 to 20 carbon atoms, more preferably a hydrogen atom or a hydrocarbon group having 1 to 18 carbon atoms, still more preferably a hydrogen atom or a hydrocarbon group having 1 to 12 carbon atoms, still more preferably a hydrogen atom or a hydrocarbon group having 1 to 4 carbon atoms, particularly preferably a hydrogen atom or a hydrocarbon group having 1 to 2 carbon atoms, most preferably a hydrogen atom or a methyl group. When $R^4$ represents a hydrocarbon group, an excessively large number of carbon atoms make the hydrophobicity of the polyoxyalkylene-based polymer as the component B excessively strong. As a result, it may become impossible to obtain good dispersibility. When $R^4$ represents a hydrocarbon group, the hydrocarbon group is preferably a saturated alkyl group or an unsaturated alkyl group. Those alkyl groups may be linear or branched.

The above-mentioned monomer (I) when p equals 0 is, for example, a polyalkylene oxide adduct of an unsaturated alcohol. The above-mentioned polyalkylene oxide adduct of an unsaturated alcohol has only to be a compound having such a structure that a polyalkylene glycol chain is added to an alcohol having an unsaturated group. Examples thereof include vinyl alcohol alkylene oxide adducts, (meth)allyl alcohol alkylene oxide adducts, 3-buten-1-ol alkylene oxide adducts, isoprene alcohol (3-methyl-3-buten-1-ol)alkylene oxide adducts, 3-methyl-2-buten-1-ol alkylene oxide adducts, 2-methyl-3-buten-2-ol alkylene oxide adducts, 2-methyl-2-buten-1-ol alkylene oxide adducts, and 2-methyl-3-buten-1-ol alkylene oxide adducts. More specific examples of the above-mentioned unsaturated alcohol polyalkylene oxide adducts include polyethylene glycol monovinyl ether, polyethylene glycol monoallyl ether, polyethylene glycol mono(2-methyl-2-propenyl)ether, polyethylene glycol mono (2-butenyl)ether, polyethylene glycol mono(3-methyl-3-butenyl)ether, polyethylene glycol mono(3-methyl-2-butenyl)ether, polyethylene glycol mono(2-methyl-3-butenyl) ether, polyethylene glycol mono(2-methyl-2-butenyl)ether, polyethylene glycol mono(1,1-dimethyl-2-propenyl)ether, polyethylene polypropylene glycol mono(3-methyl-3-butenyl)ether, and methoxy polyethylene glycol mono(3-methyl-3-butenyl)ether.

Examples of the above-mentioned monomer (I) when p equals 1 include an (alkoxy)polyalkylene glycol mono(meth)acrylate.

Examples of the above-mentioned (alkoxy)polyalkylene glycol mono(meth)acrylate include alkoxy polyalkylene glycols each obtained by adding 2 to 300 moles of an alkylene oxide group having 2 to 18 carbon atoms to any one of aliphatic alcohols each having 1 to 30-carbon atoms such as methanol, ethanol, 1-propanol, 2-propanol, 1-butanol, 2-butanol, 1-pentanol, 2-pentanol, 3-pentanol, 1-hexanol, 2-hexanol, 3-hexanol, octanol, 2-ethyl-1-hexanol, nonyl alcohol, lauryl alcohol, cetyl alcohol, and stearyl alcohol, alicyclic alcohols each having 3 to 30 carbon atoms such as cyclohexanol, and unsaturated alcohols each having 3 to 30 carbon atoms such as (meth)allyl alcohol, 3-buten-1-ol, and 3-methyl-3-buten-1-ol. Particularly preferably given are esterified products of alkoxy polyalkylene glycols each including as a main component ethylene oxide as an alkylene oxide with (meth)acrylic acid. Preferred specific examples of the above-mentioned (alkoxy)polyalkylene glycol mono(meth)acrylate include an (alkoxy)polyethylene glycol(poly) (alkylene glycol having 2 to 4 carbon atoms) (meth)acrylate. Examples of the (alkoxy)polyethylene glycol (poly) (alkylene glycol having 2 to 4 carbon atoms) (meth)acrylate include methoxy polyethylene glycol mono(meth)acrylate, methoxy{polyethylene glycol(poly)propylene glycol}mono (meth)acrylate, methoxy{polyethylene glycol(poly)butylene glycol}mono(meth)acrylate, and methoxy{polyethylene glycol(poly)propylene glycol(poly)butylene glycol}mono (meth)acrylate.

Further, specific examples of the monomer (I) include ω-methoxy polyoxyalkylene methacrylate and ω-methoxy polyoxyalkylene acrylate. Of those, ω-methoxy polyoxyalkylene methacrylate is more preferred.

Here, n in the above-mentioned general formula (I) represents 2 to 300, and represents preferably 2 to 280, more preferably 3 to 250, still more preferably 4 to 200, still more preferably 5 to 200, still more preferably 5 to 150, still more preferably 5 to 120, still more preferably 10 to 100, particularly preferably 10 to 50, most preferably 10 to 30 in terms of the dispersibility of the polymer in a hydraulic composition and a viscosity-reducing effect of the polymer. Controlling n within the above-mentioned range can provide an additive composition for a hydraulic material which brings together an excellent shrinkage-reducing function and an excellent water-reducing function, and can be used even at a high concentration when the component A is applied as a shrinkage-reducing agent. In addition, an average of n repeating units may contain the oxyalkylene groups AO's different from each other and added in a random fashion, in a block fashion, or in both a random fashion and a block fashion. The oxyalkylene groups AO's, which preferably contain oxyethylene groups, may contain oxypropylene groups and the like.

The monomer (I) can be obtained by, for example, esterification of an alkoxy polyalkylene glycol with (meth)acrylic acid. Specific examples of the monomer (I) include a (half) esterified product with (meth)acrylic acid or maleic acid of, and an ether compound with (meth)allyl alcohol of, a polyalkylene glycol terminated by a lower alkyl group at one terminal such as methoxy polyethylene glycol, methoxy polypropylene glycol, or ethoxy polyethylene polypropylene glycol, and an ethylene oxide or propylene oxide adduct of (meth)acrylic acid, maleic acid, or (meth)allyl alcohol. As the monomer (I), an esterified product of an alkoxy polyethylene glycol with (meth)acrylic acid is preferred, and an esterified product of methoxy polyethylene glycol with (meth)acrylic acid is more preferred.

In the above-mentioned general formula (II-1): $R^4$, $R^5$, and $R^6$ may be identical to or different from each other, and each represent a hydrogen atom, a methyl group, or $-(CH_2)_r$ $COOM^2$; $-(CH_2)_rCOOM^2$ may form an anhydride with $COOM^1$ or any other $-(CH_2)_rCOOM^2$, in which case, $M^1$ or $M^2$ of any one of these groups is absent; $M^1$ and $M^2$ each represent a hydrogen atom, an alkali metal, an alkaline earth metal, an ammonium group, an alkylammonium group, a substituted alkylammonium group, or an organic amine group; and r represents a number of 0 to 2. Examples of the alkali metal include lithium, sodium, and potassium. Examples of the alkaline earth metal include calcium and magnesium. Examples of the organic amine group include alkanolamine groups such as an ethanolamine group, a diethanolamine group, and a triethanolamine group, and a triethylamine group.

Examples of the monomer (II-1) represented by the above-mentioned general formula (II-1) include acrylic acid, methacrylic acid, and crotonic acid, and alkali metal salts thereof, alkaline earth metal salts thereof, ammonium salts thereof, alkylammonium salts thereof, substituted alkylammonium salts thereof, and organic amine salts thereof; maleic acid, itaconic acid, citraconic acid, and fumaric acid, and alkali metal salts thereof, alkaline earth metal salts thereof, ammonium salts thereof, alkylammonium salts thereof, substituted alkylammonium salts thereof, organic amine salts thereof, or anhydrides thereof; half esters of unsaturated dicarboxylic acid-based monomers and alcohols each having 1 to 22 carbon atoms; half amides of unsaturated dicarboxylic acids and amines each having 1 to 22 carbon atoms; half esters of unsaturated dicarboxylic acid-based monomers and glycols each having 2 to 4 carbon atoms; and a half amide of maleamic acid and a glycol having 2 to 4 carbon atoms. Of those, acrylic acid, methacrylic acid, and alkali metal salts thereof are preferred.

Examples of the monomer (II-2) represented by the above-mentioned general formula (II-2) include (meth)allylsulfonic acid or salts thereof (such as an alkali metal salt, an alkaline earth metal salt, an ammonium salt, an alkylammonium salt, a substituted alkylammonium salt, and an organic amine salt).

In the monomer (II-3) represented by the above-mentioned general formula (II-3), s represents preferably 1 to 20, more preferably 1 to 10, still more preferably 1 to 5.

Specific examples of the monomer (II-3) include phosphoric acid mono(2-hydroxyethyl)methacrylic acid ester, phosphoric acid mono(2-hydroxyethyl)acrylic acid ester, and a polyalkylene glycol mono(meth)acrylate acid phosphoric acid ester. Of those, phosphoric acid mono(2-hydroxyethyl) methacrylic acid ester is preferred from the viewpoints of ease of production and the quality stability of a product. Alkali metal salts, alkaline earth metal salts, ammonium salts, alkylammonium salts, and the like of those compounds are also permitted.

The above-mentioned polyoxyalkylene-based polymer is particularly preferably a copolymer obtained by copolymerizing the monomer (I) having a polyoxyalkylene group represented by the above-mentioned general formula (I) and at least one kind of the monomer (II) selected from the monomers each represented by the above-mentioned general formula (II-1), (II-2), or (II-3), but may contain any other appropriate monomer as a copolymerization component to such an extent that the effects of the present invention are not impaired. Only one kind of any other appropriate monomer may be used, or two or more kinds of any other appropriate monomers may be used in combination.

Examples of the above-mentioned other appropriate monomer include the following compounds.

Styrenes such as styrene, bromostyrene, chlorostyrene, and methylstyrene; dienes such as 1,3-butadiene, isoprene, and isobutylene; (meth)acrylic acid esters such as methyl (meth)acrylate, ethyl(meth)acrylate, butyl(meth)acrylate, pentyl(meth)acrylate, hexyl(meth)acrylate, decyl(meth) acrylate, and lauryl (meth)acrylate; α-olefins such as hexene, heptene, and decene; alkyl vinyl ethers such as methyl vinyl ether, ethyl vinyl ether, and butyl vinyl ether; vinyl esters such as vinyl acetate; and allyl esters such as allyl acetate.

A diester of an unsaturated dicarboxylic acid and an alcohol having 1 to 22 carbon atoms, a diamide of an unsaturated dicarboxylic acid and an amine having 1 to 22 carbon atoms, and a diester of an unsaturated dicarboxylic acid and a glycol having 2 to 4 carbon atoms.

Bifunctional (meth)acrylates such as hexanediol di(meth)acrylate, trimethylolpropane tri(meth)acrylate, and trimethylolpropane di(meth)acrylate; and unsaturated sulfonic acids such as vinylsulfonate, (meth)allylsulfonate, 2-(meth)acryloxyethylsulfonate, 3-(meth)acryloxypropylsulfonate, 3-(meth)acryloxy-2-hydroxypropylsulfonate, 3-(meth)acryloxy-2-hydroxypropylsulfophenyl ether, 3-(meth)acryloxy-2-hydroxypropyloxysulfobenzoate, 4-(meth)acryloxybutylsulfonate, (meth)acrylamide methylsulfonic acid, (meth)acrylamide ethyl sulfonic acid, 2-methylpropanesulfonic acid (meth)acrylamide, and styrene sulfonic acid, and monovalent metal salts thereof, bivalent metal salts thereof, ammonium salts thereof, and organic amine salts thereof.

Unsaturated amides such as (meth)acrylamide, (meth)acrylalkylamide, N-methylol(meth)acrylamide, and N,N-dimethyl(meth)acrylamide; allyls such as allyl alcohol; unsaturated amino compounds such as dimethylaminoethyl (meth)acrylate; and vinyl ethers and allyl ethers such as methoxy polyethylene glycol monovinyl ether, polyethylene glycol monovinyl ether, methoxy polyethylene glycol mono(meth)allyl ether, and polyethylene glycol mono(meth)allyl ether.

(Meth)acrylate compounds such as hydroxyethyl(meth)acrylate, hydroxypropyl(meth)acrylate, methoxyethyl(meth)acrylate, ethoxyethyl(meth)acrylate, butoxyethylethyl(meth)acrylate, and methoxypropyl(meth)acrylate.

The above-mentioned polyoxyalkylene-based polymer, which is particularly preferably a copolymer obtained by copolymerizing the monomer (I) having a polyoxyalkylene group represented by the above-mentioned general formula (I) and at least one kind of the monomer (II) selected from the monomers each represented by the above-mentioned general formula (II-1), (II-2), or (II-3), is more preferably a copolymer obtained by copolymerizing monomer components containing the monomer (I) having a polyoxyalkylene group represented by the above-mentioned general formula (I) and the monomer (II) containing the monomer represented by the above-mentioned general formula (II-1) as an essential component.

When the monomer components contain the monomer represented by the above-mentioned general formula (II-1), a weight ratio "monomer (I)/monomer represented by the general formula (II-1)" of the monomer (I) having a polyoxyalkylene group represented by the above-mentioned general formula (I) to the monomer represented by the above-mentioned general formula (II-1) is preferably 99/1 to 30/70. The ratio "monomer (I)/monomer represented by the general formula (II-1)" is more preferably 95/5 to 40/60. Controlling the ratio of the monomer (I) having a polyoxyalkylene group represented by the above-mentioned general formula (I) to the monomer represented by the above-mentioned general formula (II-1) within the above-mentioned range can provide an additive composition for a hydraulic material which brings together an excellent shrinkage-reducing function and an excellent water-reducing function, and can be used even at a high concentration when the component A is applied as a shrinkage-reducing agent.

When the monomer components contain the monomer represented by the above-mentioned general formula (II-1), the total content of the monomer (I) having a polyoxyalkylene group represented by the above-mentioned general formula (I) and the monomer represented by the above-mentioned general formula (II-1) in the monomer components is preferably 50 to 100 wt %, more preferably 70 to 100 wt %, still more preferably 90 to 100 wt %. Controlling the total content of the monomer (I) having a polyoxyalkylene group represented by the above-mentioned general formula (I) and the monomer represented by the above-mentioned general formula (II-1) within the above-mentioned range can provide an additive composition for a hydraulic material which brings together an excellent shrinkage-reducing function and an excellent water-reducing function, and can be used even at a high concentration when the component A is applied as a shrinkage-reducing agent.

Any appropriate method can be adopted as a method of copolymerizing the monomer components. For example, the copolymerization can be performed with the monomer components and a polymerization initiator by any appropriate polymerization method such as solution polymerization or bulk polymerization. Examples of the polymerization method include methods described in JP 3179022 B2, JP 3374369 B2, and JP 3683176 B2.

The shrinkage-reducing agent composition for a hydraulic material of the present invention may contain an air entraining agent (AE agent) (component C).

Examples of the AE agent (component C) include resin soaps, saturated or unsaturated fatty acids, sodium hydroxystearate, lauryl sulfate, alkylbenzenesulfonates (ABSs), linear alkylbenzenesulfonates (LASs), alkanesulfonates, polyoxyethylene alkyl(phenyl)ethers, polyoxyethylene alkyl(phenyl) ether sulfuric acid esters or salts thereof, polyoxyethylene alkyl(phenyl)ether phosphoric acid esters or salts thereof, proteinic materials, alkenylsulfosuccinates, α-olefin sulfonates, betaine, and imidazoline betaine. Of those, preferred are resin soaps, alkylbenzenesulfonates (ABSs), linear alkylbenzenesulfonates (LASs), polyoxyethylene alkyl(phenyl) ethers, polyoxyethylene alkyl(phenyl)ether sulfuric acid esters or salts thereof, and polyoxyethylene alkyl(phenyl) ether phosphoric acid esters or salts thereof.

Any appropriate content can be adopted as the content of the AE agent (component C) in the shrinkage-reducing agent composition for a hydraulic material of the present invention depending on purposes. The content of the AE agent (component C) in the shrinkage-reducing agent composition for a hydraulic material of the present invention is preferably 0.000001 wt % or more, more preferably 0.00001 wt % or more in terms of a solid content with respect to 100 parts by weight of a cement. An upper limit for the content of the AE agent (component C) in the shrinkage-reducing agent composition for a hydraulic material of the present invention is preferably 10 wt %, more preferably 5 wt %.

The shrinkage-reducing agent composition for a hydraulic material of the present invention may contain an antifoaming agent (component D).

Examples of the antifoaming agent (component D) include mineral oil-based antifoaming agents, fat and oil-based antifoaming agents, fatty acid-based antifoaming agents, fatty acid ester-based antifoaming agents, oxyalkylene-based antifoaming agents, alcohol-based antifoaming agents, amide-based antifoaming agents, phosphoric acid ester-based antifoaming agents, metal soap-based antifoaming agents, and silicone-based antifoaming agents. Of those, oxyalkylene-based antifoaming agents are preferred.

Examples of the mineral oil-based antifoaming agents include kerosene and liquid paraffin.

Examples of the fat and oil-based antifoaming agents include animal or vegetable oils, sesame oil, castor oil, and alkylene oxide adducts thereof.

Examples of the fatty acid-based antifoaming agents include oleic acid, stearic acid, and alkylene oxide adducts thereof.

Examples of the fatty acid ester-based antifoaming agents include glycerin monoricinoleate, alkenylsuccinic acid derivatives, sorbitol monolaurate, sorbitol trioleate, and natural waxes.

Examples of the oxyalkylene-based antifoaming agents include: polyoxyalkylenes such as (poly)oxyethylene(poly) oxypropylene adducts; (poly)oxyalkylene alkyl ethers such as diethylene glycol heptyl ether, polyoxyethylene oleyl ether, polyoxypropylene butyl ether, polyoxyethylene polyoxypropylene 2-ethylhexyl ether, and oxyethylene oxypropylene adducts of higher alcohols each having 8 or more carbon atoms and of secondary alcohols each having 12 to 14 carbon atoms; (poly)oxyalkylene(alkyl)aryl ethers such as polyoxypropylene phenyl ether and polyoxyethylene nonyl phenyl ether; acetylene ethers each produced by addition polymerization of an alkylene oxide onto an acetylene alcohol such as 2,4,7,9-tetramethyl-5-decyne-4,7-diol, 2,5-dimethyl-3-hexyne-2,5-diol, and 3-methyl-1-butyn-3-ol; (poly)oxyalkylene fatty acid esters such as diethylene glycol oleate, diethylene glycol laurate, and ethylene glycol distearate; (poly)oxyalkylenesorbitan fatty acid esters such as polyoxyethylenesorbitan monolaurate and polyoxyethylenesorbitan trioleate; (poly)oxyalkylene alkyl(aryl)ether sulfuric acid ester salts such as polyoxypropylene methyl ether sulfate sodium salt and polyoxyethylene dodecylphenol ether sulfate sodium salt; (poly)oxyalkylene alkyl phosphoric acid esters such as (poly)oxyethylene stearyl phosphate; (poly)oxyalkylene alkylamines such as polyoxyethylene laurylamine; and polyoxyalkylene amides.

Examples of the alcohol-based antifoaming agents include octyl alcohol, 2-ethylhexyl alcohol, hexadecyl alcohol, acetylene alcohol, and glycols.

Examples of the amide-based antifoaming agents include acrylate polyamine.

Examples of the phosphoric acid ester-based antifoaming agents include tributyl phosphate and sodium octyl phosphate.

Examples of the metal soap-based antifoaming agents include aluminum stearate and calcium oleate.

Examples of the silicone-based antifoaming agents include dimethyl silicone oil, silicone paste, silicone emulsions, organically modified polysiloxanes (polyorganosiloxanes such as dimethylpolysiloxane), and fluorosilicone oil.

Any appropriate content can be adopted as the content of the antifoaming agent (component D) in the shrinkage-reducing agent composition for a hydraulic material of the present invention depending on purposes. The content of the antifoaming agent (component D) in the shrinkage-reducing agent composition for a hydraulic material of the present invention is preferably 0.000001 wt % or more, more preferably 0.00001 wt % or more in terms of a solid content with respect to 100 parts by weight of a cement. An upper limit for the content of the antifoaming agent (component D) in the shrinkage-reducing agent composition for a hydraulic material of the present invention is preferably 10 wt %, more preferably 5 wt %.

The shrinkage-reducing agent composition for a hydraulic material of the present invention preferably contains the AE agent (component C) and the antifoaming agent (component D) at a weight ratio "(C)/(D)" in terms of a solid content of 90/10 to 10/90. The ratio "(C)/(D)" is more preferably 90/10 to 20/80. The ratio "(C)/(D)" is still more preferably 80/20 to 30/70. The ratio "(C)/(D)" is particularly preferably 80/20 to 40/60. Controlling the ratio of the component C to the component D within the above-mentioned range can provide a shrinkage-reducing agent composition for a hydraulic material having high general-purpose property which: does not require a combination with any other admixture; is inexpensive; suppresses a reduction in strength of a cured concrete article; and has an excellent shrinkage-reducing function. Further, the composition can: reduce the drying shrinkage of a cured concrete body to suppress the generation of a crack; and impart freezing-thawing resistance to the cured concrete body to improve the durability of the cured concrete body.

The shrinkage-reducing agent composition for a hydraulic material of the present invention may be formed only of the component A, the component B, the component C, and the component D, or may contain any other appropriate component to such an extent that the effects of the present invention are not impaired. The other appropriate component is, for example, water.

In the shrinkage-reducing agent composition for a hydraulic material of the present invention, the components A may be used alone or in combination. The components B may be used alone or in combination. The components C may be used alone or in combination. The components D may be used alone or in combination.

The shrinkage-reducing agent composition for a hydraulic material of the present invention has only to be prepared by any appropriate method. For example, the component A, the component B, the component C, and the component D, and the other appropriate component have only to be mixed by any appropriate method.

In the shrinkage-reducing agent composition for a hydraulic material of the present invention, a weight ratio "((component A)+(component C)+(component D))/(component B)" of the total of the component A, component C, and component D described above to the above-mentioned component B in terms of a solid content is preferably 99.9/0.1 to 40/60. The ratio "((component A)+(component C)+(component D))/(component B)" is more preferably 99.5/0.5 to 50/50. The ratio "((component A)+(component C)+(component D))/(component B)" is still more preferably 99/1 to 65/35. The ratio "((component A)+(component C)+(component D))/(component B)" is still more preferably 99/1 to 75/25. The ratio "((component A)+(component C)+(component D))/(component B)" is particularly preferably 98.5/1.5 to 80/20. The ratio "((component A)+(component C)+(component D))/(component B)" is most preferably 98/2 to 90/10. Controlling the ratio among the component A, the component B, the component C, and the component D within the above-mentioned range can provide a shrinkage-reducing agent composition for a hydraulic material having high general-purpose property which: does not require a combination with any other admixture; is inexpensive; suppresses a reduction in strength of a cured concrete article; and has an excellent shrinkage-reducing function. Further, the composition can: reduce the drying shrinkage of a cured concrete body to suppress the generation of a crack; and impart freezing-thawing resistance to the cured concrete body to improve the durability of the cured concrete body.

The shrinkage-reducing agent composition for a hydraulic material of the present invention may contain any other component as required as long as actions and effects of the present invention are exerted. Examples of the other component include a polyoxyalkylene derived from an oxyalkylene group as a by-product upon synthesis of the compound represented by the general formula (1), a water-soluble polymer substance, a polymer emulsion, a water-reducing agent, a retardant, a high-early-strength agent/accelerator, a surfactant, a waterproof agent, a rust inhibitor, a crack-reducing agent, an expansive additive, a cement-wetting agent, a thickener, a segregation-reducing agent, a flocculant, any other drying shrinkage-reducing agent such as a polyalkylene glycol, a strength-enhancing agent, a self-leveling agent, a rust inhibitor, a colorant, an antifungal agent, blast-furnace slag, fly ash, cinder ash, clinker ash, husk ash, silica fume, a silica powder, and plaster. Only one kind of those components may be used, or two or more kinds of them may be used in combination.

However, there is no need to use such other admixtures as listed above unless otherwise required because the shrinkage-reducing agent composition for a hydraulic material of the present invention can exert such effects as described below. The agent does not require a combination with any other admixture, is inexpensive, suppresses a reduction in strength of a cured article, and has an excellent shrinkage-reducing function.

The shrinkage-reducing agent composition for a hydraulic material of the present invention brings together an excellent shrinkage-reducing function and an excellent water-reducing function. The shrinkage-reducing agent composition for a hydraulic material of the present invention is such that the composition contains the component A and the component B at high concentrations, the component A and the component B are each excellent instability over time and are so excellent in compatibility as not to be separated or precipitated, a wide range of water/cement ratios is applicable, and even a concrete having a water/cement ratio (weight ratio) of preferably 60% to 15% can be produced. Therefore, the composition has high general-purpose property and can be used by being added to any one of the cement compositions for various applications.

A cement composition using the shrinkage-reducing agent composition for a hydraulic material of the present invention is preferably a composition obtained by adding the shrinkage-reducing agent composition for a hydraulic material of the present invention to a cement composition such as a mortar formed of a cement, a fine aggregate, and water, or a concrete formed of the mortar and a coarse aggregate at a predetermined ratio.

Examples of the cement used in the production of the cement composition include a normal, low-heat, moderate-heat, high-early-strength, ultra-high-early-strength, or sulfate-resistant Portland cement, a blast-furnace cement, a silica cement, a fly ash cement, an ecocement, and a silica fume cement. In addition, a powder in the cement composition is, for example, silica fume, fly ash, a limestone fine powder, a blast-furnace slag fine powder, an expansive additive, or any other mineral fine powder. Examples of the fine aggregate include river sand, mountain sand, sea sand, crushed sand, a heavy aggregate, a lightweight aggregate, a slag aggregate, and a recycled aggregate. Examples of the coarse aggregate include river gravel, a crushed stone, a heavy aggregate, a lightweight aggregate, a slag aggregate, and a recycled aggregate. Examples of the water include tap water described in JIS A 5308 Appendix 9, water except tap water (such as river water, lake water, or well water), and recycled water.

Any appropriate additive may be added to the cement composition. Examples of the additive include a hardening accelerator, a setting retarder, a rust inhibitor, a waterproof agent, and an antiseptic.

Any appropriate method can be adopted as a method of, for example, producing, conveying, pouring, curing, or managing the cement composition.

Any appropriate amount can be adopted as the addition amount of the shrinkage-reducing agent composition for a hydraulic material of the present invention in the cement composition depending on purposes. For example, the amount is preferably 0.5 to 10.0 wt % with respect to 100 parts by weight of the cement. In addition, when a cement volume per 100 parts by volume of the cement composition exceeds 14 vol %, the amount is preferably 0.5 to 10.0 wt %, more preferably 0.5 to 6.0 wt % with respect to 100 parts by weight of the cement.

EXAMPLES

Hereinafter, the present invention is described in more detail by way of examples. However, the present invention is not limited to these examples. It should be noted that the terms "part(s)" and "%" in the examples refer to "part(s) by weight" and "wt %", respectively unless otherwise stated.

[Measurement of Solid Content of Each Component Used in Concrete Blending]

The solid content of each component used in the evaluations of a concrete for its physical properties was measured as described below.

1. An aluminum dish was precisely weighed.
2. A component whose solid content was to be measured was mounted on the aluminum dish that had been precisely weighed, and was then precisely weighed.
3. Under a nitrogen atmosphere, the component that had been precisely weighed in the above-mentioned section 2 was loaded into a drying machine with its temperature adjusted to 130° C. for 1 hour.
4. After a lapse of 1 hour, the above-mentioned component was taken out of the drying machine, and was then left standing to cool in a desiccator for 15 minutes.
5. After a lapse of 15 minutes, the above-mentioned component after the drying was taken out of the desiccator, and then the aluminum dish and the above-mentioned component after the drying were precisely weighed.
6. The solid content was calculated from the following equation.

$$\text{Solid content (\%)} = \{[(\text{weight obtained in precise weighing of the above-mentioned section 5}) - (\text{weight obtained in precise weighing of the above-mentioned section 1})]/[(\text{weight obtained in precise weighing of the above-mentioned section 2}) - (\text{weight obtained in precise weighing of the above-mentioned section 1})]\} \times 100$$

[Evaluations of Mortar for its Physical Properties]

<<Mortar Kneading>>

Mortar kneading was performed by using 225 g of a product obtained by weighing a predetermined amount of a shrinkage-reducing agent (component A) and diluting the agent with water, 450 g of a normal Portland cement (manufactured by Taiheiyo Cement Corporation), and 1,350 g of standard sand for a cement strength test (specified in 5.1.3 of JIS R5201-1997 Appendix 2: Japan Cement Association) with a Hobart mortar mixer (manufactured by Hobart, model: N-50) in accordance with the method of JIS R5201-1997.

In addition, an antifoaming agent (polyalkylene glycol derivative) was used as required to adjust a mortar air content so that the mortar air content had an error within ±3 vol % with respect to the air content of a mortar to which the component A was not added (reference mortar).

<<Measurement of Mortar Air Content>>

The mortar air content was measured with a 500-ml measuring cylinder in conformity with JIS A1174 (a test method for the bulk density of a polymer cement mortar that had not hardened yet and a test method for an air content on the basis of a weight (gravimetric method)).

<<Evaluation for Drying Shrinkage-Reducing Performance>>

Mortar kneading was performed in the same manner as in the above-mentioned section 1. Next, a mortar specimen (4×4×16 cm) for a drying shrinkage-reducing performance evaluation was produced in accordance with JIS A1129. A silicon grease was applied to a mold in advance so that water was stopped and stripping was able to be easily performed. In addition, gauge studs were mounted on both ends of the specimen. The mold into which a mortar obtained by the kneading had been poured was placed in a container, and then the container was hermetically sealed. The mold was stored at 20° C. so that initial curing was performed. After a lapse of 1 day, the specimen was stripped from the mold, and then the silicon grease adhering to the specimen was water-washed with a tawashi. Subsequently, the specimen was subjected to curing in still water at 20° C. for 6 days (water curing). Immediately after water on the surface of the specimen subjected to the curing in still water for 6 days had been wiped off with a paper towel, the length of the specimen was measured with a dial gauge (manufactured by Nishinihon Shikenki) in accordance with JIS A1129, and the length at this time was defined as a reference. After that, the specimen was stored in a thermo-hygrostat with its temperature and humidity set to 20° C. and 60%, respectively, and the lengths of the specimen were measured at the appropriate times. As represented by the following equation, a length change ratio in this case is a ratio of the shrinkage amount of the mortar to which the component A is added to the shrinkage amount of the reference mortar. A smaller value for the ratio indicates a larger extent to which the shrinkage can be reduced.

Length change ratio={(shrinkage amount of mortar to which component A is added)/(shrinkage amount of reference mortar)}×100

[Evaluations of Concrete for its Physical Properties]
<<Evaluations of Fresh Concrete for its Slump Value and Air Content>>

The resultant fresh concrete was evaluated for its slump value and air content by the following methods.

Slump value: JIS A 1101-1998
Air content: JIS A 1128-1998

<<Evaluation for Concrete Compressive Strength>>

The resultant fresh concrete was loaded into a specimen mold (having a diameter of 10 cm and a height of 20 cm) for a compressive strength evaluation. Then, the mold was hermetically sealed and stored at 20° C. so that initial curing was performed. After a lapse of 1 day, the resultant was stripped from the mold, and was then subjected to water curing at 20° C. A compressive strength at a material age (curing age) of 7 days was measured in conformity with JIS A 1108. As represented by the following equation, a compressive strength ratio in this case is a ratio of the compressive strength of a concrete to which a shrinkage-reducing agent is added to the compressive strength of a concrete in which no shrinkage-reducing agent is used (reference concrete). A larger value for the ratio indicates a larger extent to which a reduction in compressive strength is suppressed.

Compressive strength ratio={(compressive strength of concrete to which shrinkage-reducing agent is added)/(compressive strength of reference concrete)}×100

<<Measurement of Spacing Factor>>

The spacing factor serving as an indicator for freezing-thawing resistance of a mortar obtained as described below was measured with an air void analyzer (available under the trade name "AVA" from Germann Instruments). The mortar was obtained by: kneading the AE agent (component C) and the antifoaming agent (component D) to provide a concrete having a predetermined air content (5.0±0.5%); and removing an aggregate having a size of 6 mm or more after the kneading.

First, 250 ml of a solution for measurement with the AVA and about 2,000 ml of water with their temperatures adjusted to 20° C. were subjected to measurement. Next, the solution and water were charged into a column. After that, 20 ml of the mortar were collected and injected into the bottom of the column. After the injection, the mortar was stirred for 30 seconds so that the entrained air of the mortar was sufficiently released into the liquid. The spacing factor was calculated by measuring the amount of the released air bubbles over time. Upon calculation of the spacing factor, a value obtained by subtracting a volume occupied by the aggregate having a size of 6 mm or more from the total volume of the concrete (mortar bulk ratio) was set to 64.3%. As the value for the spacing factor reduces, the air bubbles entrained in the concrete are more densely dispersed (in other words, high-quality air bubbles are entrained in the concrete), and hence the mortar may be excellent in freezing-thawing resistance.

<<Evaluation for Freezing-Thawing Resistance>>

The resultant fresh concrete was loaded into a specimen mold measuring 10 cm by 10 cm by 40 cm, and was then subjected to sealed curing for 2 days at 20° C. After that, the specimen was stripped from the mold, and was then subjected to water curing in still water at 20° C. for an additional 28 days. After that, the specimen was evaluated for its freezing-thawing resistance.

The evaluation for the freezing-thawing resistance was performed in accordance with the method A in JIS A 1148-2001 by measuring a first resonance frequency and a specimen weight in accordance with JIS A 1127-2001 every 30 cycles.

As represented by the following equation (1), the evaluation for the freezing-thawing resistance every 30 cycles in this case was performed by calculating a relative dynamic elastic constant from a first resonance frequency at the time of the termination of each cycle with respect to a first resonance frequency before the initiation of a freezing and thawing cycle (0 cycles). The maximum number of freezing and thawing cycles was set to 300, and the evaluation was terminated when the relative dynamic elastic constant became 60% or less before the 300 cycles. In addition, an evaluation for the final freezing-thawing resistance was performed by calculating a durability factor represented by the following equation (2). As each of those values is closer to 100, the freezing-thawing resistance of the specimen is better.

Relative dynamic elastic constant (%)=$(f_n^2/f_0^2)$×100 (1)

$f_n$: A first resonance frequency (Hz) after n cycles of freezing and thawing $f_0$: A first resonance frequency (Hz) after 0 cycles of freezing and thawing Durability factor=$(P \times N)/300$ (2)

P: A relative dynamic elastic constant (%) at the time of N cycles of freezing and thawing N: The smaller one of the number of cycles of freezing and thawing at which a relative dynamic elastic constant becomes 60% or less and 300

Production Example 1

Production of Copolymer (1)

First, 200.2 g of water were charged into a reactor made of glass provided with a temperature gauge, a stirring machine, a dropping apparatus, a nitrogen-introducing pipe, and a reflux condenser. Next, the air in the reactor was replaced with nitrogen under stirring, and then the inside of the reactor was heated to 80° C. under a nitrogen atmosphere. A monomer aqueous solution prepared by mixing 225.2 g of a methoxy polyethylene glycol monoacrylate (having an average added mole number of ethylene oxide of 25), 44.8 g of methacrylic acid, 450 g of water, and 2.2 g of 3-mercaptopropionic acid as a chain transfer agent was dropped to the reaction vessel over 4 hours, and 60 g of a 5.2% aqueous solution of ammonium persulfate were dropped to the reaction vessel over 5 hours. After the termination of the dropping of the 5.2% aqueous solution of ammonium persulfate, the temperature was continuously maintained at 80° C. for an additional 1 hour so that a polymerization reaction was completed. The resultant was neutralized with a 30% aqueous solution of sodium hydroxide so as to have a pH of 7.0. Thus, a copolymer aqueous solution having a weight-average molecular weight of 22,600 (copolymer (1)) was obtained.

Production Example 2

Production of Copolymer (2)

First, 200.2 g of water were charged into a reactor made of glass provided with a temperature gauge, a stirring machine, a dropping apparatus, a nitrogen-introducing pipe, and a reflux condenser. Next, the air in the reactor was replaced with nitrogen under stirring, and then the inside of the reactor was heated to 80° C. under a nitrogen atmosphere. A monomer aqueous solution prepared by mixing 239.9 g of a methoxy polyethylene glycol monoacrylate (having an average added mole number of ethylene oxide of 25), 20.1 g of methacrylic acid, 450 g of water, and 2.2 g of 3-mercaptopropionic acid as a chain transfer agent was dropped to the reaction vessel over 4 hours, and 60 g of a 5.2% aqueous solution of ammonium persulfate were dropped to the reaction vessel over 5 hours. After the termination of the dropping of the 5.2% aqueous solution of ammonium persulfate, the temperature was continuously maintained at 80° C. for an additional 1 hour so that a polymerization reaction was completed. The resultant was neutralized with a 30% aqueous solution of sodium hydroxide so as to have a pH of 7.0. Thus, a copolymer aqueous solution having a weight-average molecular weight of 35,600 (copolymer (2)) was obtained.

Production Example 3

Synthesis of Copolymer Aqueous Solution PC-1 Corresponding to Polymer as Component B The copolymer (1) obtained in Production Example 1 and the copolymer (2) obtained in Production Example 2 were mixed at a weight ratio "copolymer (1)/copolymer (2)" in terms of a solid content of 30/70. Thus, a copolymer aqueous solution PC-1 corresponding to a polymer as the component B was obtained.

Production Example 4

Production of Copolymer (3)

First, 14.66 parts by weight of ion-exchanged water and 49.37 parts by weight of an unsaturated polyalkylene glycol ether monomer (IPN50) obtained by adding an average of 50 moles of ethylene oxide to 3-methyl-3-buten-1-ol were loaded into a reactor made of glass provided with a temperature gauge, a stirring machine, a dropping apparatus, a nitrogen-introducing pipe, and a reflux condenser. Next, the air in the reactor was replaced with nitrogen under stirring, and then the temperature in the reactor was increased to 60° C. under a nitrogen atmosphere. After that, 2.39 parts by weight of a 2% aqueous solution of hydrogen peroxide were added to the mixture. An aqueous solution formed of 3.15 parts by weight of acrylic acid and 0.79 part by weight of ion-exchanged water was dropped to the reactor over 3.0 hours, and an aqueous solution formed of 0.13 part by weight of 3-mercaptopropionic acid, 0.06 part by weight of L-ascorbic acid, and 15.91 parts by weight of ion-exchanged water was dropped to the reactor over 3.5 hours. After that, the temperature was continuously maintained at 60° C. for 1 hour, and was then cooled so that a polymerization reaction was terminated. The pH of the resultant was adjusted to 7.0 with a 48% aqueous solution of sodium hydroxide. Thus, a copolymer aqueous solution having a weight-average molecular weight of 37,700 (copolymer (3)) was obtained.

Production Example 5

Production of Copolymer (4)

On the other hand, 42.43 parts by weight of ion-exchanged water and 49.37 parts by weight of the IPN50 were loaded into another reactor made of glass provided with a temperature gauge, a stirring machine, a dropping apparatus, a nitrogen-introducing pipe, and a reflux condenser. Next, the air in the reactor was replaced with nitrogen under stirring, and then the temperature in the reactor was increased to 60° C. under a nitrogen atmosphere. After that, 4.12 parts by weight of a 2% aqueous solution of hydrogen peroxide were added to the mixture. An aqueous solution formed of 3.11 parts by weight of acrylic acid, 5.90 parts by weight of 2-hydroxyethyl acrylate, and 2.26 parts by weight of ion-exchanged water was dropped to the reactor over 3.0 hours, and an aqueous solution formed of 0.33 part by weight of 3-mercaptopropionic acid, 0.11 part by weight of L-ascorbic acid, and 15.91 parts by weight of ion-exchanged water was dropped to the reactor over 3.5 hours. After that, the temperature was continuously maintained at 60° C. for 1 hour, and was then cooled so that a polymerization reaction was terminated. The pH of the resultant was adjusted to 7.0 with a 48% aqueous solution of sodium hydroxide. Thus, a copolymer aqueous solution having a weight-average molecular weight of 31,900 (copolymer (4)) was obtained.

Production Example 6

Synthesis of Copolymer Aqueous Solution PC-2 Corresponding to Polymer as Component B The copolymer (3) obtained in Production Example 4 and the copolymer (4) obtained in Production Example 5 were mixed at a weight ratio "copolymer (3)/copolymer (4)" in terms of a solid content of 30/70. Thus, a copolymer aqueous solution PC-2 corresponding to a polymer as the component B was obtained.

Example 1

First, 50 g of commercially available trimethylolpropane and 1.25 g of sodium hydroxide were loaded into a pressure vessel provided with a stirring machine, a pressure gauge, and a temperature gauge. Next, the temperature of the reaction system was increased to 120° C. or more. After that, 2,562.4 g of ethylene oxide were added while the temperature was maintained at 150±5° C. Thus, a compound in which 50 moles of ethylene oxide were added to each active hydrogen of trimethylolpropane (hereinafter referred to as "TMP150") was obtained.

First, 1,000 g of the TMP150 and 0.25 g of sodium hydroxide were loaded into a pressure vessel provided with a stirring machine, a pressure gauge, and a temperature gauge. Next, the temperature of the reaction system was increased to 120° C. or more. After that, 490 g of ethylene oxide were added while the temperature was maintained at 150±5° C. Thus, a compound in which 75 moles of ethylene oxide were added to each active hydrogen of trimethylolpropane (hereinafter referred to as "TMP225") was obtained.

The blending amount of the resultant TMP225 was set to 1 part by weight with respect to 100 parts by weight of a cement, and then evaluations for an air content and drying shrinkage-reducing performance were performed. Table 1 shows the blends used and Table 2 shows the results of the evaluations.

Comparative Example 1

First, 500 g of the TMP225 and 0.3 g of sodium hydroxide were loaded into a pressure vessel provided with a stirring machine, a pressure gauge, and a temperature gauge. Next, the temperature of the reaction system was increased to 120° C. or more. After that, 526.2 g of ethylene oxide were added while the temperature was maintained at 150±5° C. Thus, a compound in which 155 moles of ethylene oxide were added to each active hydrogen of trimethylolpropane (hereinafter referred to as "TMP465") was obtained.

The blending amount of the resultant TMP465 was set to 1 part by weight with respect to 100 parts by weight of a cement, and then evaluations for an air content and drying shrinkage-reducing performance were performed. Table 1 shows the blends used and Table 2 shows the results of the evaluations.

TABLE 1

| | Name | Content |
|---|---|---|
| Component A | TMP6 | Ethylene oxide 6-mole adduct of trimethylolpropane (2 moles of ethylene oxide are added to 1 mole of an OH group) |
| | TMP150 | Ethylene oxide 150-mole adduct of trimethylolpropane (50 moles of ethylene oxide are added to 1 mole of an OH group) |
| | TMP225 | Ethylene oxide 225-mole adduct of trimethylolpropane (75 moles of ethylene oxide are added to 1 mole of an OH group) |

TABLE 1-continued

| | Name | Content |
|---|---|---|
| | TMP465 | Ethylene oxide 465-mole adduct of trimethylolpropane (155 moles of ethylene oxide are added to 1 mole of an OH group) |
| | PNT6 | Ethylene oxide 6-mole adduct of pentaerythritol (1.5 moles of ethylene oxide are added to 1 mole of an OH group) Commercial product |
| | PNT40 | Ethylene oxide 40-mole adduct of pentaerythritol (10 moles of ethylene oxide are added to 1 mole of an OH group) |
| | PNT80 | Ethylene oxide 80-mole adduct of pentaerythritol (20 moles of ethylene oxide are added to 1 mole of an OH group) |
| | SRA-1 | Ethylene oxide-propylene oxide adduct of primary alcohol Commercial product |
| Component B | PC-1 | Copolymer mixture containing 30 wt % of copolymer (1) and 70 wt % of copolymer (2) |
| Component C | AE-1 | Microair 303A (MA303A) (manufactured by BASF Pozzolith) (alkyl ether-based anionic surfactant) |
| | AE-2 | Adeka Hope YES-25 (manufactured by ADEKA CORPORATION) (higher alcohol ethoxy sulfate) |
| Component D | DEF-1 | Microair 404 (MA404) (manufactured by BASF Pozzolith) (polyalkylene glycol derivative) |
| | DEF-2 | ADEKANOL LG299 (manufactured by ADEKA CORPORATION) (polyoxyalkylene glycol alkyl ether) |

TABLE 2

| | Shrinkage-reducing agent Component A | | Admixture blending ratio (in terms of solid content) (% with respect to cement) | | Mortar physical properties | Shrinkage-reducing performance (length change ratio) | | |
|---|---|---|---|---|---|---|---|---|
| | Type | Added amount of A¹O (mole(s)/—OH) | Shrinkage-reducing agent Component A (wt %) | Antifoaming agent Component D DEF-1 (wt %) | Air content (vol %) | Material age (Drying age) of 4 weeks | Material age (Drying age) of 8 weeks | Material age (Drying age) of 12 weeks |
| Example 1 | TMP 225 | 75.0 | 1.0 | 0.0010 | 4.8 | 80 | 83 | 84 |
| Comparative Example 1 | TMP 465 | 155.0 | 1.0 | 0.0013 | 5.2 | 104 | 105 | 104 |

As shown in Table 2, the TMP225 in which the added mole number of ethylene oxide per mole of active hydrogen is 75 shows a smaller length change ratio than that of the TMP465 in which the added mole number of ethylene oxide per mole of active hydrogen is 155. Accordingly, it is found that the TMP225 shows better shrinkage-reducing performance than that of the TMP465.

Example 2

The blending amount of the TMP225 obtained in Example 1 was set to 2 parts by weight with respect to 100 parts by weight of a cement, and then evaluations for an air content and drying shrinkage-reducing performance were performed. Table 1 shows the blends used and Table 3 shows the results of the evaluations.

Example 3

The blending amount of the TMP150 obtained in Example 1 was set to 2 parts by weight with respect to 100 parts by weight of a cement, and then evaluations for an air content and drying shrinkage-reducing performance were performed. Table 1 shows the blends used and Table 3 shows the results of the evaluations.

Example 4

First, 140 g of an ethylene oxide 4-mole addition product of pentaerythritol (PNT4: commercial product) and 0.7 g of sodium hydroxide were loaded into a pressure vessel provided with a stirring machine, a pressure gauge, and a temperature gauge. Next, the temperature of the reaction system was increased to 150° C. or more. After that, 697.3 g of ethylene oxide were added while the temperature was maintained at 150±5° C. Thus, a compound in which 10 moles of ethylene oxide were added to each active hydrogen of pentaerythritol (hereinafter referred to as "PNT40") was obtained.

The blending amount of the resultant PNT40 was set to 2 parts by weight with respect to 100 parts by weight of a cement, and then evaluations for an air content and drying shrinkage-reducing performance were performed. Table 1 shows the blends used and Table 3 shows the results of the evaluations.

Example 5

First, 700 g of the PNT40 and 0.5 g of sodium hydroxide were loaded into a pressure vessel provided with a stirring machine, a pressure gauge, and a temperature gauge. Next, the temperature of the reaction system was increased to 150° C. or more. After that, 649.8 g of ethylene oxide were added while the temperature was maintained at 150±5° C. Thus, a compound in which 20 moles of ethylene oxide were added to each active hydrogen of pentaerythritol (hereinafter referred to as "PNT80") was obtained.

The blending amount of the resultant PNT80 was set to 2 parts by weight with respect to 100 parts by weight of a cement, and then evaluations for an air content and drying shrinkage-reducing performance were performed. Table 1 shows the blends used and Table 3 shows the results of the evaluations.

Example 6

(Initial Step (I))

First, 190 parts of trimethylolpropane and 8.59 parts of a 48% aqueous solution of sodium hydroxide were loaded into a high-pressure reaction vessel made of stainless steel provided with a temperature gauge, a stirring machine, and nitrogen- and ethylene oxide-introducing pipes. Next, the air in the reaction vessel was replaced with nitrogen, and then the mixture was stirred under heat while the temperature in the reaction vessel was increased to 80° C. under a nitrogen atmosphere. Under the stirring under heat, the pressure in the reaction vessel was reduced and the internal temperature was increased to 120° C. while a trace amount of nitrogen was flowed. Then, dehydration was performed at an internal pressure of 50 mmHg for 1 hour. After the dehydration had been performed for 1 hour, the pressure was increased with nitrogen and the internal temperature was increased to 150° C. While the internal temperature was held at 150° C. under a safety pressure (such a condition that the partial pressure of nitrogen in the reaction vessel was always higher than that of ethylene oxide), 1,871.4 parts of ethylene oxide were introduced into the reaction vessel over 6 hours. Further, the temperature was held for 30 minutes so that an ethylene oxide addition reaction was completed. Thus, 2,061.4 parts of an ethylene oxide low-molar adduct (A) in which ethylene oxide was added to trimethylolpropane in an amount of 10 moles per mole of a hydroxyl group were obtained. The resultant ethylene oxide low-molar adduct (A) was in a liquid state at 25° C. and had a viscosity of 1,400 mPa·s.

(Added Mole Number-adjusting Step (II))

First, 340 parts of the ethylene oxide low-molar adduct (A) obtained in the initial step (I) were introduced into another high-pressure reaction vessel made of stainless steel provided with a temperature gauge, a stirring machine, and nitrogen- and ethylene oxide-introducing pipes through a pipe arrangement by reflux. Next, the air in the reaction vessel was replaced with nitrogen, and then the internal temperature was increased to 150° C. While the internal temperature was held at 150° C. under a safety pressure (such a condition that the partial pressure of nitrogen in the reaction vessel was always higher than that of ethylene oxide), 2,006.3 parts of ethylene oxide were introduced into the reaction vessel over 7 hours. Further, the temperature was held for 30 minutes so that ethylene oxide was added to the ethylene oxide low-molar adduct (A) in an amount of 65 moles per mole of a hydroxyl group. As a result, 2,346.3 parts of a polyoxyalkylene compound (TMP225) in which a total of 225 moles of ethylene oxide were added to 1 mole of trimethylolpropane were obtained.

(Evaluations)

The blending amount of the resultant TMP225 was set to 2 parts by weight with respect to 100 parts by weight of a cement, and then evaluations for an air content and drying shrinkage-reducing performance were performed. Table 1 shows the blends used and Table 3 shows the results of the evaluations.

Comparative Example 2

First, 450 g of commercially available trimethylolpropane and 0.67 g of sodium hydroxide were loaded into a pressure vessel provided with a stirring machine, a pressure gauge, and a temperature gauge. Next, the temperature of the reaction system was increased to 120° C. or more. After that, 886.5 g of ethylene oxide were added while the temperature was maintained at 150±5° C. Thus, a compound in which 2 moles of ethylene oxide were added to each active hydrogen of trimethylolpropane (hereinafter referred to as "TMP6") was obtained.

The blending amount of the resultant TMP6 was set to 2 parts by weight with respect to 100 parts by weight of a cement, and then evaluations for an air content and drying shrinkage-reducing performance were performed. Table 1 shows the blends used and Table 3 shows the results of the evaluations.

Comparative Example 3

The blending amount of an ethylene oxide 6-mole addition product of pentaerythritol (PNT6: commercial product) was set to 2 parts by weight with respect to 100 parts by weight of a cement, and then evaluations for an air content and drying shrinkage-reducing performance were performed. Table 1 shows the blends used and Table 3 shows the results of the evaluations.

TABLE 3

| | Shrinkage-reducing agent Component A | | Admixture blending ratio (in terms of solid content) (% with respect to cement) | | Mortar physical properties | Shrinkage-reducing performance (length change ratio) | | |
|---|---|---|---|---|---|---|---|---|
| | Type | Added amount of A$^j$O (mole(s)/—OH) | Shrinkage-reducing agent Component A (wt %) | Antifoaming agent Component D DEF-1 (wt %) | Air content (vol %) | Material age (Drying age) of 4 weeks | Material age (Drying age) of 8 weeks | Material age (Drying age) of 12 weeks |
| Example 2 | TMP 225 | 75.0 | 2.0 | 0.0010 | 4.0 | 67 | 75 | 76 |
| Example 3 | TMP 150 | 50.0 | 2.0 | 0.0006 | 5.2 | 64 | 70 | 73 |
| Example 4 | PNT 40 | 10.0 | 2.0 | 0.0010 | 4.1 | 65 | 67 | 70 |
| Example 5 | PNT 80 | 20.0 | 2.0 | 0.0008 | 3.8 | 64 | 69 | 72 |
| Example 6 | TMP 225 | 75.0 | 2.0 | 0.0010 | 4.1 | 67 | 77 | 76 |
| Comparative Example 2 | TMP 6 | 2.0 | 2.0 | 0.0006 | 5.7 | 89 | 90 | 89 |
| Comparative Example 3 | PNT 6 | 1.5 | 2.0 | 0.0006 | 4.6 | 88 | 94 | 93 |

As shown in Table 3, the TMP225, TMP150, PNT80, and PNT40 in which the added mole number of ethylene oxide per mole of active hydrogen is 75, 50, 20, or 10, respectively, each show a smaller length change ratio those of the PNT6 and TMP6 in which the added mole number of ethylene oxide per mole of active hydrogen is 1.5 mole or 2 mole, respectively. Accordingly, it is found that the TMP225, the TMP150, and the PNT40 each show better shrinkage-reducing performance than those of the PNT6 and the TMP6.

Examples 7 to 9 and Comparative Example 4

<<Concrete Blending>>

The respective materials were metered according to the following concrete blending ratios so that a mixing volume was 30 L, and then the materials were kneaded with a pan forced action mixer. It should be noted that a cement used was a uniform mixture of normal Portland cements (each having a specific gravity of 3.16) manufactured by Taiheiyo Cement Corporation, Sumitomo Osaka Cement Co., Ltd., and UBE-MITSUBISHI CEMENT CORPORATION. In this case, land sand produced in Kakegawa and land sand produced in Kimitsu were each used as a fine aggregate, and an Ome hard sandstone was used as a coarse aggregate. In addition, the water-reducing agent (component B), and the air content adjustors (the AE agent (component C) and the antifoaming agent (component D)) were used to adjust the slump value and air content of a concrete to 18±2 cm and 4.5±1.5%, respectively.

<Concrete Blending Ratios>

Unit cement content: 350 kg/m$^3$
Unit water content: 175 kg/m$^3$
Unit fine aggregate content: 841 kg/m$^3$
Unit coarse aggregate content: 905 kg/m$^3$
(Water/cement ratio (W/C): 50.0%, fine aggregate ratio (s/a): 49.0%)

<<Mixing of Materials>>

The coarse aggregate and a half amount of the fine aggregates to be used were loaded into a mixer, and then the contents were subjected to dry mixing for 5 seconds. After that, rotation was stopped, and then the cement and the remaining fine aggregates were loaded. After the contents had been subjected to dry mixing for an additional 5 seconds, the rotation was stopped again, and then water containing the shrinkage-reducing agent (component A), the air content adjustors (the AE agent (component C) and the anti foaming agent (component D)), and the water-reducing agent (component B) was added to the mixture. After the contents had been kneaded for 90 seconds, the concrete was taken out of the mixer.

<<Evaluations>>

The concrete that had been taken out (fresh concrete) was evaluated for its slump value, air content, and compressive strength (at a material age (curing age) of 7 days). Table 1 shows the blends used and Table 4 shows the results of the evaluations.

TABLE 4

| | Admixture blending ratio (in terms of solid content) (% with respect to cement) | | | | | Physical properties of fresh concrete | | | Compressive strength ratio |
|---|---|---|---|---|---|---|---|---|---|
| | Shrinkage-reducing agent Component A | | Water-reducing agent Component B PC-1 | AE agent Component C AE-1 | Antifoaming agent Component D DEF-1 | Air content (vol %) | Slump value (cm) | Flow (cm) | Material age (Curing age) of 7 days |
| | Kind | Addition amount | | | | | | | |
| Example 7 | TMP 225 | 2.0 | 0.070 | 0.00036 | 0.0004 | 5.5 | 19.5 | 31.0 | 106 |
| Example 8 | TMP 150 | 2.0 | 0.070 | 0.00036 | 0.0004 | 4.2 | 20.0 | 32.5 | 100 |
| Example 9 | PNT 40 | 2.0 | 0.070 | 0.00035 | — | 5.1 | 17.0 | 28.5 | 107 |
| Comparative Example 4 | SRA-1 | 2.0 | 0.070 | 0.00036 | 0.0008 | 4.3 | 18.5 | 31.0 | 90 |

As shown in Table 4, the concretes using the TMP225, the TMP150, and the PNT40 each show a compressive strength ratio of 100 or more. Accordingly, it is found that the use of the shrinkage-reducing agent has no influence on the compressive strength. On the other hand, the concrete using the SRA-1 having only one polyoxyalkylene chain in any one of its molecules shows a compressive strength ratio of 90. Accordingly, it is found that the use of the shrinkage-reducing agent remarkably reduces the compressive strength. Therefore, it can be said that the use of the shrinkage-reducing agent for a hydraulic material of the present invention has an improving effect on the durability of a cured concrete body because the agent can exert good shrinkage-reducing performance to suppress the generation of a crack and to suppress a reduction in compressive strength.

Examples 10 to 12 and Comparative Example 5

Fresh concretes (each having an air content of 5.0±0.5%) were prepared according to the blending ratios shown in Table 5 in the same manner as in Examples 7 to 9 and Comparative Example 4, and then their spacing factors and durability factors were measured. Table 5 shows the results.

TABLE 5

| | | Blending ratio of each component (in terms of solid content) (% with respect to cement) | | | | Blending ratio (in terms of solid content) (weight ratio) | | Concrete physical properties | | |
|---|---|---|---|---|---|---|---|---|---|---|
| | | Component A | Component B | Component C | Component D | | | Air | Spacing | |
| | Component A Kind | Addition amount (wt %) | PC-1 Addition amount (wt %) | Addition amount (wt %) | Addition amount (wt %) | C/D | (A + C + D)/B | content (vol %) | factor (μm) | Durability factor |
| Example 10 | TMP 225 | 2.0 | 0.065 | AE-1 0.00036 | DEF-1 0.00030 | 54.4/45.5 | 96.9/3.1 | 4.9 | 281 | 85.0 |
| Example 11 | TMP 150 | 2.0 | 0.065 | AE-1 0.00036 | DEF-1 0.00028 | 56.3/43.7 | 96.9/3.1 | 5.2 | 290 | 80.0 |
| Example 12 | TMP 225 | 2.0 | 0.070 | AE-2 0.001 | DEF-2 0.00140 | 41.7/58.3 | 96.6/3.4 | 5.0 | 284 | 89.0 |
| Comparative Example 5 | SRA-1 | 2.0 | 0.070 | AE-1 0.00036 | DEF-1 0.00076 | 32.1/67.9 | 96.6/3.4 | 4.5 | 503 | 5.0 |

As shown in Table 5, the concretes using the TMP150 and the TMP225 each show a spacing factor of 280 to 290 μm. Accordingly, it is found that high-quality air bubbles are entrained in the concretes. In addition, each of the concretes shows a durability factor of 80 to 90, and is hence found to be excellent in freezing-thawing resistance. On the other hand, the concrete using the SRA-1 having only one oxyalkylene chain in any one of its molecules shows a spacing factor of 503 μm, and hence the quality of the air bubbles entrained in the concrete reduces. Further, the concrete shows a durability factor of 5.0. Accordingly, it is found that the concrete is poor in freezing-thawing resistance.

Examples 13 to 15 and Comparative Examples 6 and 7

Fresh concretes (each having an air content of 4.5±1.5%) were prepared according to the blending ratios shown in Table 6 in the same manner as in Examples 7 to 9 and Comparative Example 4, and then their shrinkage-reducing performance (length change ratios) was measured. Table 6 shows the results.

TABLE 6

| | | Blending ratio of each component (% with respect to cement) | | | Concrete physical properties | | Shrinkage-reducing performance (length change ratio) | |
|---|---|---|---|---|---|---|---|---|
| | Component A Kind | Component A Addition amount (wt %) | Component B PC-1 Addition amount (wt %) | Component C AE-1 Addition amount (wt %) | Slump value (cm) | Air content (vol %) | Material age (Drying age) of 4 weeks | Material age (Drying age) of 8 weeks |
| Example 13 | TMP 225 | 2.0 | 0.065 | — | 21.0 | 3.6 | 77 | 75 |
| Example 14 | TMP 225 | 1.0 | 0.070 | 0.00018 | 21.5 | 3.9 | 89 | 90 |
| Example 15 | TMP 150 | 2.0 | 0.065 | — | 19.5 | 4.0 | 74 | 79 |
| Comparative Example 6 | SB 600 | 2.0 | 0.065 | 0.00028 | 19.5 | 3.6 | 84 | 87 |
| Comparative Example 7 | — | — | 0.080 | 0.00032 | 21.5 | 3.5 | 100 | 100 |

As shown in Table 6, when the TMP150 and the TMP225 in each of which ethylene oxide is added to trimethylolpropane as a trihydric alcohol are each added at 1 or 2 wt % in terms of a solid content with respect to the cement, each of the concretes shows a length change ratio at a material age (drying age) of 8 weeks of 75 to 90, and hence shows good shrinkage-reducing performance. On the other hand, when the SB600 in which ethylene oxide was added to sorbitol as a hexahydric alcohol was added at 2 wt % in terms of a solid content with respect to the cement, the concrete showed a length change ratio at a material age (drying age) of 8 weeks of 87, and hence showed shrinkage-reducing performance nothing more than that in the case where the TMP225 was added at 1 wt %.

Production Example 7

Production of TMP50

First, 120 g of commercially available trimethylolpropane and 2.1 g of sodium hydroxide were loaded into a pressure vessel provided with a stirring machine, a pressure gauge, and a temperature gauge. Next, the temperature of the reaction system was increased to 120° C. or more. After that, 1,969.9 g of ethylene oxide were added while the temperature was maintained at 150±5° C. Thus, a compound in which 16.7 moles of ethylene oxide were added to each active hydrogen of trimethylolpropane (hereinafter referred to as "TMP50") was obtained.

Production Example 8

Production of TMP150

First, 900 g of the TMP50 was loaded into a pressure vessel provided with a stirring machine, a pressure gauge, and a temperature gauge. Next, the temperature of the reaction system was increased to 120° C. or more. After that, 1,696.6 g of ethylene oxide were added while the temperature was maintained at 150±5° C. Thus, a compound in which 50 moles of ethylene oxide were added to each active hydrogen of trimethylolpropane (hereinafter referred to as "TMP150") was obtained.

Production Example 9

Production of TMP225

First, 600 g of the TMP50 and 0.4 g of sodium hydroxide were loaded into a pressure vessel provided with a stirring machine, a pressure gauge, and a temperature gauge. Next, the temperature of the reaction system was increased to 120° C. or more. After that, 1,979.4 g of ethylene oxide were added while the temperature was maintained at 150±5° C. Thus, a compound in which 75 moles of ethylene oxide were added to each active hydrogen of trimethylolpropane (hereinafter referred to as "TMP225") was obtained.

Production Example 10

Production of SB600

First, 100 g of commercially available sorbitol and 0.8 g of sodium hydroxide were loaded into a pressure vessel provided with a stirring machine, a pressure gauge, and a temperature gauge. Next, the temperature of the reaction system was increased to 120° C. or more. After that, 1,450.8 g of ethylene oxide were added while the temperature was maintained at 150±5° C. Thus, a compound in which 10 moles of ethylene oxide were added to each active hydrogen of sorbitol (hereinafter referred to as "SB600") was obtained.

Production Example 11

Production of MBD100

First, 100 g of commercially available N-n-butylethanolamine and 1.18 g of sodium hydroxide were loaded into a pressure vessel provided with a stirring machine, a pressure gauge, and a temperature gauge. Next, the temperature of the reaction system was increased to 150° C. After that, 2,676.3 g of ethylene oxide were added while the temperature was maintained at 150±5° C. Thus, a compound in which 50 moles of ethylene oxide were added to each active hydrogen of N-n-butylethanolamine (hereinafter referred to as "MBD100") was obtained.

Production Example 12

Production of MBD200

First, 100 g of commercially available N-n-butylethanolamine and 1.18 g of sodium hydroxide were loaded into a pressure vessel provided with a stirring machine, a pressure gauge, and a temperature gauge. Next, the temperature of the reaction system was increased to 150° C. After that, 5,407.3 g of ethylene oxide were added while the temperature was maintained at 150±5° C. Thus, a compound in which 100 moles of ethylene oxide were added to each active hydrogen of N-n-butylethanolamine (hereinafter referred to as "MBD200") was obtained.

Examples 16 to 23 and Comparative Examples 8 to 11

<<Concrete Blending>>

The respective materials were metered according to the following concrete blending ratios so that a mixing volume was 30 L, and then the materials were kneaded with a pan forced action mixer. It should be noted that a cement used was a uniform mixture of normal Portland cements (each having a specific gravity of 3.16) manufactured by Taiheiyo Cement Corporation, Sumitomo Osaka Cement Co., Ltd., and UBE-MITSUBISHI CEMENT CORPORATION. In this case, land sand produced in Kakegawa and land sand produced in Kimitsu were each used as a fine aggregate, and an Ome hard sandstone was used as a coarse aggregate. In addition, the water-reducing agent (component B), and the air content adjustors (the AE agent (component C) and the antifoaming agent (component D)) were used to adjust the flow value and air content of a concrete to 310±20 mm and 4.5±1.5%, respectively.

<Concrete Blending Ratios>
  Unit cement content: 350 kg/m$^3$
  Unit water content: 175 kg/m$^3$
  Unit fine aggregate content: 841 kg/m$^3$
  Unit coarse aggregate content: 905 kg/m$^3$
  (Water/cement ratio (W/C): 50.0%, fine aggregate ratio (s/a): 49.0%)

<<Mixing of Materials>>

The coarse aggregate and a half amount of the fine aggregates to be used were loaded into a mixer, and then the contents were subjected to dry mixing for 5 seconds. After that, rotation was stopped, and then the cement and the remaining fine aggregates were loaded. After the contents had been subjected to dry mixing for an additional 5 seconds, the rotation was stopped again, and then water containing the shrinkage-reducing agent (component A), the air content adjustors (the AE agent (component C) and the antifoaming agent (component D)), and the water-reducing agent (component B) was added to the mixture. After the contents had been kneaded for 90 seconds, the concrete was taken out of the mixer.

<<Evaluations>>

The concrete that had been taken out (fresh concrete) was evaluated for its slump value, air content, drying shrinkage-reducing performance, and compressive strength. Table 7 shows the blends used and Table 8 shows the results of the evaluations.

TABLE 7

| | Name | Content |
|---|---|---|
| Component A | TMP50 | Ethylene oxide 50-mole adduct of trimethylolpropane (16.7 moles of ethylene oxide are added to 1 mole of an OH group) |
| | TMP150 | Ethylene oxide 150-mole adduct of trimethylolpropane (50 moles of ethylene oxide are added to 1 mole of an OH group) |
| | TMP225 | Ethylene oxide 225-mole adduct of trimethylolpropane (75 moles of ethylene oxide are added to 1 mole of an OH group) |
| | SB600 | Ethylene oxide 60-mole adduct of sorbitol (10 moles of ethylene oxide are added to 1 mole of an OH group) |
| | SRA-1 | Ethylene oxide-propylene oxide adduct of primary alcohol (commercial product) *It should be noted that the adduct does not correspond to the component A of the present invention. |
| | SP200 | EPOMIN SP-200 (manufactured by NIPPON SHOKUBAI CO., LTD.) (polyethyleneimine having a molecular weight of 20,000) |
| | MBD100 | 100-mole adduct in which 50 moles of ethylene oxide are added to each active hydrogen of N-n-butylethanolamine |
| | MBD200 | 200-mole adduct in which 100 moles of ethylene oxide are added to each active hydrogen of N-n-butylethanolamine |
| Component B | PC-1 | Copolymer mixture containing 30 mass % of copolymer (1) and 70 mass % of copolymer (2) |
| | PC-2 | Copolymer mixture containing 30 mass % of copolymer (3) and 70 mass % of copolymer (4) |
| Component C | AE-1 | Microair 303A (MA303A) (manufactured by BASF Pozzolith) (alkyl ether-based anionic surfactant) |
| | AE-2 | Adeka Hope YES-25 (manufactured by ADEKA CORPORATION) (higher alcohol ethoxy sulfate) |
| Component D | DEF-1 | Microair 404 (MA404) (manufactured by BASF Pozzolith) (polyalkylene glycol derivative) |
| | DEF-2 | ADEKANOL LG299 (manufactured by ADEKA CORPORATION) (polyoxyalkylene glycol alkyl ether) |
| | DEF-3 | Polyoxyethylene (5 mol)/oxypropylene (33 mol) glycol alkyl ether of higher alcohol (having 16 to 18 carbon atoms) (block addition type (1)) |
| | DEF-4 | Polyoxyethylene (5 mol)/oxypropylene (33 mol) glycol alkyl ether of higher alcohol (having 16 to 18 carbon atoms) (block addition type (2)) |
| | DEF-5 | Polyoxyethylene (10 mol)/oxypropylene (33 mol) glycol alkyl ether of higher alcohol (having 16 to 18 carbon atoms) (random addition type) |

TABLE 8

| | Blending ratio of each component (in terms of solid content) (% with respect to cement) | | | Blending ratio (in terms of solid content) A/B (weight ratio) | Concrete physical properties | | |
|---|---|---|---|---|---|---|---|
| | Component A Kind | Component A Addition amount (wt %) | Component B PC-1 Addition amount (wt %) | Component C AE-1 Addition amount (wt %) | | Slump value (cm) | Flow (mm) | Air content (vol %) |
| Example 16 | TMP 225 | 2.0 | 0.065 | — | 96.9/3.1 | 21.0 | 325 | 3.6 |
| Example 17 | TMP 225 | 1.0 | 0.070 | 0.00018 | 93.5/6.5 | 21.5 | 320 | 3.9 |
| Example 18 | TMP 150 | 2.0 | 0.065 | — | 96.9/3.1 | 19.5 | 310 | 4.0 |
| Example 19 | TMP 50 | 2.0 | 0.070 | 0.00013 | 96.6/3.4 | 19.0 | 310 | 4.2 |
| Example 20 | SB 600 | 2.0 | 0.060 | 0.00028 | 97.1/2.9 | 19.5 | 295 | 3.6 |
| Example 21 | SP 200 | 2.0 | 0.085 | 0.00020 | 95.9/4.1 | 19.0 | 290 | 3.9 |
| Example 22 | MBD 100 | 2.0 | 0.065 | — | 96.9/3.1 | 20.5 | 320 | 4.3 |
| Example 23 | MBD 200 | 2.0 | 0.070 | — | 96.6/3.4 | 21.0 | 310 | 4.5 |
| Comparative Example 8 | TMP 225 | 0.04 | 0.080 | 0.00033 | 33.3/66.7 | 20.5 | 315 | 3.7 |
| Comparative Example 9 | SB 600 | 0.06 | 0.080 | 0.00033 | 42.9/57.1 | 19.5 | 300 | 3.8 |
| Comparative Example 10 | SRA-1 | 2.0 | 0.070 | 0.00080 | 96.6/3.4 | 18.5 | 310 | 4.3 |
| Comparative Example 11 | — | — | 0.080 | 0.00033 | — | 21.5 | 330 | 3.5 |

| | Shrinkage-reducing performance (length change ratio) | | Compressive strength (compressive strength ratio) | |
|---|---|---|---|---|
| | Material age (Drying age) of 4 weeks | Material age (Drying age) of 8 weeks | Material age (Curing age) of 7 days | Material age (Curing age) of 28 days |
| Example 16 | 77 | 75 | 106 | 108 |
| Example 17 | 89 | 90 | 104 | 105 |
| Example 18 | 74 | 79 | 100 | 104 |

TABLE 8-continued

| | | | | |
|---|---|---|---|---|
| Example 19 | 75 | 81 | 105 | 106 |
| Example 20 | 84 | 87 | 102 | 104 |
| Example 21 | 74 | 79 | 102 | 107 |
| Example 22 | 75 | 74 | 100 | 101 |
| Example 23 | 80 | 78 | 101 | 103 |
| Comparative Example 8 | 101 | 100 | 99 | 100 |
| Comparative Example 9 | 100 | 100 | 100 | 99 |
| Comparative Example 10 | 75 | 71 | 90 | 97 |
| Comparative Example 11 | 100 | 100 | 100 | 100 |

As shown in Table 8, Examples 16 to 23 in which the component A and the component B are used at predetermined blending ratios each show a length change ratio lower than that of the reference concrete to which the component A is not added (Comparative Example 10) by about 10 to 20%. Accordingly, it is found that the concretes each have good shrinkage-reducing performance. On the other hand, the addition amount of the component A becomes remarkably small in each of Comparative Examples 8 and 9 where the ratio "component A/component B" is lower than a predetermined ratio. Accordingly, it is found that sufficient shrinkage-reducing performance cannot be obtained.

With regard to the compressive strength as well, the use of a predetermined amount of the component A is found to improve the compressive strength because each of Examples 16 to 23 shows a compressive strength ratio at each material age (curing age) of 100 or more. On the other hand, the addition amount of the component A is small in each of Comparative Examples 8 and 9 where the ratio "component A/component B" is lower than the predetermined ratio. Accordingly, it is found that nearly no improvement in compressive strength can be achieved. Further, as shown in Comparative Example 10, when the SRA-1 having only one polyoxyalkylene chain in any one of its molecules is used, the concrete shows a compressive strength ratio of less than 100. Accordingly, it is found that the use of the SRA-1 reduces the compressive strength.

Examples 24 to 26 and Comparative Example 12

Fresh concretes (each having an air content of 5.0±0.5%) were prepared according to the blending ratios shown in Table 9 in the same manner as in Examples 16 to 23 and Comparative Examples 8 to 11, and then their spacing factors were measured. Table 9 shows the results.

As the value for a spacing factor reduces, the air bubbles entrained in a concrete are more finely and densely dispersed (in other words, high-quality air bubbles are entrained in the concrete), and hence the concrete is excellent in freezing-thawing resistance.

As shown in Table 9, a certain amount of air can be entrained in a concrete formed of any combination of the components. However, a variation in spacing factor was observed depending on the kind of the component A used and the blending ratio "component C/component D".

As shown in Comparative Example 12, when the SRA-1 having only one polyoxyalkylene chain in any one of its molecules is used, the spacing factor is large. Accordingly, it cannot be said that the quality of the air bubbles entrained in the concrete is high. On the other hand, as shown in Examples 20 to 22, it can be said that the use of the component A, the component B, the component C, and the component D at predetermined ratios improves the freezing-thawing resistance because the use allows one to maintain an air content and to entrain high-quality air having a small spacing factor in a concrete.

Examples 27 to 31 and Comparative Examples 13 to 16

Fresh concretes (each having an air content of 5.0±1.0%) were prepared according to the blending ratios shown in Table 10 in the same manner as in Examples 16 to 23 and Comparative Examples 8 to 11, and then their spacing factors and durability factors were measured. Table 10 shows the results.

TABLE 9

| | | Blending ratio of each component (in terms of solid content) (% with respect to cement) | | | | Blending ratio (in terms of solid content) (weight ratio) | | Concrete physical properties | |
|---|---|---|---|---|---|---|---|---|---|
| | Component | Component A Addition | Component B PC-1 Addition | Component C AE-1 Addition | Component D DEF-1 Addition | | | Air content | Spacing factor |
| | A Kind | amount (wt %) | amount (wt %) | amount (wt %) | amount (wt %) | A/B | C/D | (vol %) | (μm) |
| Example 24 | TMP 225 | 2.0 | 0.065 | 0.00035 | 0.00030 | 96.9/3.1 | 53.8/46.2 | 4.9 | 281 |
| Example 25 | TMP 150 | 2.0 | 0.065 | 0.00035 | 0.00034 | 96.9/3.1 | 50.7/49.3 | 5.2 | 290 |
| Example 26 | TMP 50 | 2.0 | 0.070 | 0.00035 | 0.00030 | 96.6/3.4 | 53.8/46.2 | 5.4 | 340 |
| Comparative Example 12 | SRA-1 | 2.0 | 0.070 | 0.00035 | 0.00076 | 96.6/3.4 | 31.5/68.5 | 4.5 | 503 |

TABLE 10

| | Blending ratio of each component (in terms of solid content) (% with respect to cement) | | | | Blending ratio (in terms of solid content) (weight ratio) | | Concrete physical properties | | |
|---|---|---|---|---|---|---|---|---|---|
| | Component A | Component B PC-1 Addition | Component C Addition | Component D Addition | | | Air content | Spacing factor | Durability |
| Component | A Kind | amount (wt %) | amount (wt %) | amount (wt %) | amount (wt %) | A/B | C/D | (vol %) | (μm) | factor |
| Example 27 | TMP 225 | 2.0 | 0.065 | AE-1 0.00035 | DEF-1 0.00030 | 96.9/3.1 | 53.8/46.2 | 4.9 | 281 | 85.0 |
| Example 28 | TMP 150 | 2.0 | 0.065 | AE-1 0.00035 | DEF-1 0.00034 | 96.9/3.1 | 50.7/49.3 | 5.2 | 290 | 80.0 |
| Example 29 | SB 600 | 2.0 | 0.060 | AE-1 0.00117 | DEF-1 0.0105 | 97.1/2.9 | 52.7/47.3 | 5.0 | 285 | 83.0 |
| Example 30 | TMP 225 | 2.0 | 0.070 | AE-2 0.00100 | DEF-2 0.0014 | 96.6/3.4 | 41.7/58.3 | 5.0 | 284 | 89.0 |
| Example 31 | SP 200 | 2.0 | 0.085 | AE-1 0.00035 | DEF-1 0.00025 | 95.9/4.1 | 58.3/41.7 | 5.2 | 290 | 79.0 |
| Comparative Example 13 | SRA-1 | 2.0 | 0.070 | AE-1 0.00035 | DEF-1 0.00076 | 96.6/3.4 | 31.5/68.5 | 4.5 | 503 | 5.0 |
| Comparative Example 14 | SB 600 | 2.0 | 0.060 | AE-1 0.00028 | — | 97.1/2.9 | 100/0 | 4.6 | 475 | 16.8 |
| Comparative Example 15 | TMP 225 | 2.0 | 0.065 | AE-1 0.00015 | — | 96.9/3.1 | 100/0 | 5.5 | 430 | 20.4 |
| Comparative Example 16 | SP 200 | 2.0 | 0.085 | AE-1 0.00020 | — | 95.9/4.1 | 100/0 | 4.0 | 441 | 28.0 |

As shown in Examples 27 to 31 of Table 10, the adjustment of the blending ratio "component C/component D" within a predetermined range allows one to entrain high-quality air bubbles having a small spacing factor in a concrete, and as a result, the concrete shows an additionally high durability factor. Accordingly, it is found that good freezing-thawing resistance can be imparted to the concrete. On the other hand, the spacing factor is large and the durability factor is low in each of Comparative Example 13 where the SRA-1 having only one polyoxyalkylene chain in any one of its molecules is used, and Comparative Examples 14, 15, and 16 where the blending ratio "component C/component D" is not adjusted within the predetermined range. Accordingly, it is found that the quality of the air bubbles entrained in each of the concretes and the freezing-thawing resistance of each of the concretes reduce.

Examples 32 to 37 and Comparative Examples 17 to 19

<<Concrete Blending>>

The respective materials were metered according to the following concrete blending ratios so that a mixing volume was 30 L, and then the materials were kneaded with a forced action biaxial mixer. It should be noted that a cement used was a uniform mixture of normal Portland cements (each having a specific gravity of 3.16) manufactured by Taiheiyo Cement Corporation, Sumitomo Osaka Cement Co., Ltd., and UBE-MITSUBISHI CEMENT CORPORATION. In this case, land sand produced in Kakegawa and land sand produced in Kimitsu were each used as a fine aggregate, and an Ome hard sandstone was used as a coarse aggregate. In addition, the water-reducing agent (component B), and the air content adjustors (the AE agent (component C) and the antifoaming agent (component D)) were used to adjust the slump value and air content of a concrete to 8±1 cm and 5±1%, respectively.

<Concrete Blending Ratios>

Unit cement content: 301 kg/m$^3$

Unit water content: 160 kg/m$^3$

Unit fine aggregate content: 824 kg/m$^3$

Unit coarse aggregate content: 1,002 kg/m$^3$ (Water/cement ratio (W/C): 53.1%, fine aggregate ratio (s/a): 46.0%)

<<Mixing of Materials>>

The coarse aggregate and a half amount of the fine aggregates to be used were loaded into a mixer, and then the contents were subjected to dry mixing for 5 seconds. After that, rotation was stopped, and then the cement and the remaining fine aggregates were loaded. After the contents had been subjected to dry mixing for an additional 5 seconds, the rotation was stopped again, and then water containing the shrinkage-reducing agent (component A), the air content adjustors (the AE agent (component C) and the antifoaming agent (component D)), and the water-reducing agent (component B) was added to the mixture. After the contents had been kneaded for 90 seconds, the concrete was taken out of the mixer.

<<Evaluations>>

The concrete that had been taken out (fresh concrete) was evaluated for its durability factor and shrinkage-reducing performance. Table 11 shows the blends used and Table 12 shows the results of the evaluations.

TABLE 11

| | Component | Component A Addition | Component B Addition | Component C Addition | Component D Addition | Blending ratio (in terms of solid content) (weight ratio) | |
|---|---|---|---|---|---|---|---|
| | A Kind | amount (wt %) | amount (wt %) | amount (wt %) | amount (wt %) | A/B | C/D |
| Example 32 | TMP 225 | 2.0 | PC-1 0.035 | AE-2 0.00100 | DEF-2 0.0016 | 98.3/1.7 | 38.5/61.5 |
| Example 33 | TMP 225 | 2.0 | PC-1 0.045 | AE-2 0.00100 | DEF-3 0.0013 | 97.8/2.2 | 43.5/56.5 |
| Example 34 | TMP 225 | 2.0 | PC-1 0.030 | AE-2 0.00100 | DEF-4 0.0016 | 98.5/1.5 | 38.5/61.5 |
| Example 35 | TMP 225 | 2.0 | PC-1 0.035 | AE-2 0.00100 | DEF-5 0.0008 | 98.3/1.7 | 55.6/44.4 |
| Example 36 | TMP 225 | 3.0 | PC-1 0.025 | AE-2 0.00100 | DEF-4 0.0033 | 99.2/0.8 | 23.3/76.7 |
| Example 37 | TMP 225 | 2.0 | PC-2 0.035 | AE-2 0.00200 | DEF-2 0.0034 | 98.3/1.7 | 37.0/63.0 |
| Comparative Example 17 | — | — | PC-1 0.045 | AE-1 0.00089 | — | 0/100 | 100/0 |
| Comparative Example 18 | — | — | PC-2 0.045 | AE-2 0.00050 | — | 0/100 | 100/0 |
| Comparative Example 19 | TMP 225 | 2.0 | PC-2 0.025 | — | DEF-2 0.0010 | 100/0 | 0/100 |

TABLE 12

| | Concrete physical properties | | | Freezing-thawing resistance Durability factor | Shrinkage-reducing performance (length change ratio) | |
|---|---|---|---|---|---|---|
| | Slump value (cm) | Air content (vol %) | Spacing factor (μm) | | Material age (Drying age) of 4 weeks | Material age (Drying age) of 13 weeks |
| Example 32 | 9.0 | 5.2 | 216 | 76.0 | 74 | 85 |
| Example 33 | 8.5 | 4.7 | 183 | 76.0 | 74 | 86 |
| Example 34 | 9.0 | 5.5 | 209 | 78.0 | 76 | 85 |
| Example 35 | 8.0 | 5.7 | 259 | 67.0 | 75 | 86 |
| Example 36 | 7.0 | 5.5 | 222 | 83.0 | 60 | 79 |
| Example 37 | 8.0 | 5.5 | 430 | 20.4 | 77 | 86 |
| Comparative Example 17 | 8.0 | 4.8 | 236 | 76.0 | 100 | 100 |
| Comparative Example 18 | 7.5 | 4.5 | 161 | 76.0 | 100 | 100 |
| Comparative Example 19 | 7.0 | 1.6 | 730 | 3.1 | 74 | 85 |

As can be seen from Tables 11 and 12, in the case where the component A in the present invention is absent (Comparative Example 17 or Comparative Example 18), even when the durability factor in the case is comparable to that in the case where the component A in the present invention is present, the shrinkage-reducing performance deteriorates as compared with that in the case where the component A in the present invention is present.

Examples 38 to 41 and Comparative Examples 20 and 21

<<Concrete Blending>>

The respective materials were metered according to the following concrete blending ratios so that a mixing volume was 30 L, and then the materials were kneaded with a pan forced action mixer. It should be noted that a cement used was a uniform mixture of normal Portland cements (each having a specific gravity of 3.16) manufactured by Taiheiyo Cement Corporation, Sumitomo Osaka Cement Co., Ltd., and UBE-MITSUBISHI CEMENT CORPORATION. In this case, land sand produced in Kakegawa and land sand produced in Kimitsu were each used as a fine aggregate, and an Ome hard sandstone was used as a coarse aggregate. In addition, commercially available air content adjustors (the AE agent (component C) and the antifoaming agent (component D)) were used to adjust the flow value and air content of a concrete to 28±2 cm and 4.5±1.5%, respectively.

<Concrete Blending Ratios>

Unit cement content: 350 kg/m$^3$
Unit water content: 175 kg/m$^3$
Unit fine aggregate content: 841 kg/m$^3$
Unit coarse aggregate content: 905 kg/m$^3$
(Water/cement ratio (W/C): 50.0%, fine aggregate ratio (s/a): 49.0%)

<<Mixing of Materials>>

The coarse aggregate and a half amount of the fine aggregates to be used were loaded into a mixer, and then the contents were subjected to dry mixing for 5 seconds. After that, rotation was stopped, and then the cement and the remaining fine aggregates were loaded. After the contents had been subjected to dry mixing for an additional 5 seconds, the rotation was stopped again, and then water containing the shrinkage-reducing agent (component A), the water-reducing agent (component B), the AE agent (component C), and the antifoaming agent (component D) was added to the mixture.

After the contents had been kneaded for 90 seconds, the concrete was taken out of the mixer.

<<Evaluations>>

The concrete that had been taken out (fresh concrete) was evaluated for its concrete physical properties. Table 13 shows the blends used and Table 14 shows the results of the evaluations.

TABLE 13

| | Name | Content |
|---|---|---|
| Component A | TMP50 | Ethylene oxide 50-mole adduct of trimethylol-propane (16.7 moles of ethylene oxide are added to 1 mole of an OH group) |
| | TMP150 | Ethylene oxide 150-mole adduct of trimethylol-propane (50 moles of ethylene oxide are added to 1 mole of an OH group) |
| | TMP225 | Ethylene oxide 225-mole adduct of trimethylolpropane (75 moles of ethylene oxide are added to 1 mole of an OH group) |

TABLE 13-continued

| | Name | Content |
|---|---|---|
| Component C | AE-1 | Microair 303A (MA303A) (manufactured by BASF Pozzolith) (alkyl ether-based anionic surfactant) |
| | AE-2 | Adeka Hope YES-25 (manufactured by ADEKA CORPORATION) (higher alcohol ethoxy sulfate) |
| Component D | DEF-1 | Microair 404 (MA404) (manufactured by BASF Pozzolith) (polyalkylene glycol derivative) |
| | DEF-2 | ADEKANOL LG299 (manufactured by ADEKA CORPORATION) (polyoxyalkylene glycol alkyl ether) |
| | DEF-3 | Polyoxyethylene (5 mol)/oxypropylene (33 mol) glycol alkyl ether of higher alcohol (having 16 to 18 carbon atoms) (block addition type (1)) |
| | DEF-4 | Polyoxyethylene (5 mol)/oxypropylene (33 mol) glycol alkyl ether of higher alcohol (having 16 to 18 carbon atoms) (block addition type (2)) |
| | DEF-5 | Polyoxyethylene (10 mol)/oxypropylene (33 mol) glycol alkyl ether of higher alcohol (having 16 to 18 carbon atoms) (random addition type) |

TABLE 13-continued

| | Name | Content |
|---|---|---|
| | SB600 | Ethylene oxide 60-mole adduct of sorbitol (10 moles of ethylene oxide are added to 1 mole of an OH group) |
| | SRA-1 | Ethylene oxide-propylene oxide adduct of primary alcohol (commercial product) |
| Component B | PC-1 | Copolymer mixture containing 30 wt % of copolymer (1) and 70 wt % of copolymer (2) |
| | PC-2 | Copolymer mixture containing 30 mass % of copolymer (3) and 70 mass % of copolymer (4) |

TABLE 14

| | | Blending ratio of each component (in terms of solid content) (% with respect to cement) | | | | Blending ratio (in terms of solid content) (weight ratio) | |
|---|---|---|---|---|---|---|---|
| | | Component A | Component C | Component D | Component B | | |
| | Component A Kind | Addition amount (wt %) | Addition amount (wt %) | DEF-1 Addition amount (wt %) | PC-1 Addition amount (wt %) | C/D | (A + C + D)/B |
| Example 38 | TMP 50 | 2.0 | AE-1 0.00036 | 0.00030 | 0.070 | 54.5/45.5 | 96.6/3.4 |
| Example 39 | TMP 150 | 2.0 | AE-1 0.00036 | 0.00034 | 0.065 | 51.4/48.6 | 96.9/3.1 |
| Example 40 | TMP 225 | 2.0 | AE-1 0.00036 | 0.00040 | 0.065 | 47.4/52.6 | 96.9/3.1 |
| Example 41 | TMP 225 | 2.0 | AE-2 0.00140 | 0.00040 | 0.070 | 77.8/22.2 | 96.6/3.4 |
| Comparative Example 20 | TMP 225 | 2.0 | AE-1 0.00015 | — | 0.065 | 100/0 | 96.9/3.1 |
| Comparative Example 21 | SRA-1 | 2.0 | AE-1 0.00036 | 0.00076 | 0.070 | 32.1/67.9 | 96.6/3.4 |

| | Concrete physical properties | | | |
|---|---|---|---|---|
| | | | Shrinkage-reducing performance (length change ratio) | |
| | Air content (vol %) | Spacing factor (μm) | Material age (Drying age) of 4 weeks | Material age (Drying age) of 8 weeks |
| Example 38 | 5.4 | 340 | 72 | 73 |
| Example 39 | 5.2 | 290 | 72 | 74 |
| Example 40 | 4.6 | 316 | 75 | 76 |
| Example 41 | 4.8 | 340 | 74 | 75 |
| Comparative Example 20 | 5.5 | 430 | 75 | 78 |
| Comparative Example 21 | 4.5 | 503 | 75 | 70 |

Table 14 shows the results of the measurement of the air contents and spacing factors of the fresh concretes. As those values reduce, the air bubbles entrained in a concrete are more finely and densely dispersed (in other words, high-quality air bubbles are entrained in the concrete), and hence the concrete may be excellent in freezing-thawing resistance.

A certain amount of air can be entrained in a concrete formed of any combination of the components. However, a variation in spacing factor was observed depending on the kind of the shrinkage-reducing agent (component A) used and the blending ratio "AE agent (component C)/antifoaming agent (component D)". The spacing factor is large when the air content is adjusted with the AE agent alone as shown in Comparative Example 20 or when the SRA-1 having only one polyoxyalkylene chain in any one of its molecules is used as shown in Comparative Example 21. Accordingly, it cannot be said that the quality of the air bubbles entrained in the concrete is high.

On the other hand, as shown in Examples 38 to 41, it can be said that the use of the shrinkage-reducing agent having a branched structure containing three or more polyoxyalkylene chains in any one of its molecules (component A), the AE agent (component C), and the antifoaming agent (component D) improves the freezing-thawing resistance because the use allows one to maintain an air content and to entrain high-quality air having a small spacing factor in a concrete.

Examples 42 to 45 and Comparative Examples 22 to 24

Fresh concretes (each having an air content of 5.0±0.5%) were prepared according to the blending ratios shown in Table 15 in the same manner as in Examples 38 to 41 and Comparative Examples 20 and 21, and then their spacing factors and durability factors were measured. Table 15 shows the results.

Examples 46 to 51 and Comparative Example 25

<<Concrete Blending>>

The respective materials were metered according to the following concrete blending ratios so that a mixing volume was 30 L, and then the materials were kneaded with a forced action biaxial mixer. It should be noted that a cement used was a uniform mixture of normal Portland cements (each having a specific gravity of 3.16) manufactured by Taiheiyo Cement Corporation, Sumitomo Osaka Cement Co., Ltd., and UBE-MITSUBISHI CEMENT CORPORATION. In this case, land sand produced in Kakegawa and land sand produced in Kimitsu were each used as a fine aggregate, and an Ome hard sandstone was used as a coarse aggregate. In addition, a high-performance AE water-reducing agent (component B), and the air content adjustors (the AE agent (component C) and the antifoaming agent (component D)) were used to adjust the slump value and air content of a concrete to 8±1 cm and 5±1%, respectively.

<Concrete Blending Ratios>
 Unit cement content: 301 kg/m$^3$
 Unit water content: 160 kg/m$^3$
 Unit fine aggregate content: 824 kg/m$^3$

TABLE 15

| | | Blending ratio of each component (in terms of solid content) (% with respect to cement) | | | | Blending ratio (in terms of solid content) (weight ratio) | | Concrete physical properties | | |
|---|---|---|---|---|---|---|---|---|---|---|
| | | Component A | Component C | Component D | Component B | | | Air | Spacing | |
| | Component A Kind | Addition amount (wt %) | Addition amount (wt %) | Addition amount (wt %) | PC-1 Addition amount (wt %) | C/D | (A + C + D)/B | content (vol %) | factor (μm) | Durability factor |
| Example 42 | TMP 225 | 2.0 | AE-1 0.00036 | DEF-1 0.0003 | 0.065 | 54.4/45.5 | 96.9/3.1 | 4.9 | 281 | 85.0 |
| Example 43 | TMP 150 | 2.0 | AE-1 0.00036 | DEF-1 0.00028 | 0.065 | 56.3/43.7 | 96.9/3.1 | 5.2 | 290 | 80.0 |
| Example 44 | SB 600 | 2.0 | AE-1 0.00117 | DEF-1 0.00105 | 0.060 | 52.7/47.3 | 97.1/2.9 | 5.0 | 285 | 83.0 |
| Example 45 | TMP 225 | 2.0 | AE-2 0.00100 | DEF-2 0.0014 | 0.070 | 41.7/58.3 | 96.6/3.4 | 5.0 | 284 | 89.0 |
| Comparative Example 22 | TMP 225 | 2.0 | AE-1 0.00038 | — | 0.065 | 100/0 | 96.9/3.1 | 5.5 | 430 | 20.4 |
| Comparative Example 23 | SRA-1 | 2.0 | AE-1 0.00036 | DEF-1 0.00076 | 0.070 | 32.1/67.9 | 96.6/3.4 | 4.5 | 503 | 5.0 |
| Comparative Example 24 | SB 600 | 2.0 | AE-1 0.00028 | — | 0.060 | 100/0 | 97.1/2.9 | 4.6 | 475 | 16.8 |

As shown in Examples 42 to 45, blending appropriate amounts of the shrinkage-reducing agent having a branched structure containing three or more polyoxyalkylene chains in any one of its molecules (component A), the AE agent (component C), and the antifoaming agent (component D) is found to allow one to entrain high-quality air bubbles in a concrete to improve the freezing-thawing resistance.

On the other hand, as can be seen from Comparative Examples 22 and 24, good freezing-thawing resistance cannot be obtained when the blending ratio "(component C)/(component D)" of the AE agent (component C) to the antifoaming agent (component D) is not proper. Further, as can be seen from Comparative Example 23, in the case where the SRA-1 having only one polyoxyalkylene chain in any one of its molecules is used, the durability factor becomes lower and the freezing-thawing resistance reduces even when the blending ratio "(component C)/(component D)" of the AE agent (component C) to the antifoaming agent (component D) is a proper ratio.

Unit coarse aggregate content: 1,002 kg/m$^3$
(Water/cement ratio (W/C): 53.1%, fine aggregate ratio (s/a): 46.0%)

<<Mixing of Materials>>

The coarse aggregate and a half amount of the fine aggregates to be used were loaded into a mixer, and then the contents were subjected to dry mixing for 5 seconds. After that, rotation was stopped, and then the cement and the remaining fine aggregates were loaded. After the contents had been subjected to dry mixing for an additional 5 seconds, the rotation was stopped again, and then water containing the shrinkage-reducing agent (component A), the air content adjustors (the AE agent (component C) and the antifoaming agent (component D)), and the high-performance AE water-reducing agent (component B) was added to the mixture. After the contents had been kneaded for 90 seconds, the concrete was taken out of the mixer.

<<Evaluations>>

The concrete that had been taken out (fresh concrete) was evaluated for its durability factor and shrinkage-reducing performance. Table 16 shows the blends used and Table 17 shows the results of the evaluations.

TABLE 16

| | | Blending ratio of each component (in terms of solid content) (% with respect to cement) | | | | Blending ratio (in terms of solid content) (weight ratio) | |
|---|---|---|---|---|---|---|---|
| | | Component A | Component C | Component D | Component B | | |
| | Component A Kind | Addition amount (wt %) | Addition amount (wt %) | Addition amount (wt %) | Addition amount (wt %) | C/D | (A + C + D)/B |
| Example 46 | TMP 225 | 2.0 | AE-2 0.00100 | DEF-2 0.0016 | PC-1 0.035 | 38.5/61.5 | 98.3/1.7 |
| Example 47 | TMP 225 | 2.0 | AE-2 0.00100 | DEF-3 0.0013 | PC-1 0.045 | 43.5/56.5 | 97.8/2.2 |
| Example 48 | TMP 225 | 2.0 | AE-2 0.00100 | DEF-4 0.0016 | PC-1 0.030 | 38.5/61.5 | 98.5/1.5 |
| Example 49 | TMP 225 | 2.0 | AE-2 0.00100 | DEF-5 0.0008 | PC-1 0.035 | 55.6/44.4 | 98.3/2.7 |
| Example 50 | TMP 225 | 3.0 | AE-2 0.00100 | DEF-4 0.0033 | PC-1 0.025 | 23.3/76.7 | 98.8/1.3 |
| Example 51 | TMP 225 | 2.0 | AE-2 0.00200 | DEF-2 0.0034 | PC-2 0.035 | 37.0/63.0 | 98.3/1.7 |
| Comparative Example 25 | TMP 225 | 2.0 | — | DEF-2 0.0010 | PC-2 0.025 | 0/100 | 98.8/1.2 |

TABLE 17

| | Concrete physical properties | | | Freezing-thawing resistance Durability factor | Shrinkage-reducing performance (length change ratio) | |
|---|---|---|---|---|---|---|
| | Slump value (cm) | Air content (vol %) | Spacing factor (μm) | | Material age (Drying age) of 4 weeks | Material age (Drying age) of 13 weeks |
| Example 46 | 9.0 | 5.2 | 216 | 76.0 | 74 | 85 |
| Example 47 | 8.5 | 4.7 | 183 | 76.0 | 74 | 86 |
| Example 48 | 9.0 | 5.5 | 209 | 78.0 | 76 | 85 |
| Example 49 | 8.0 | 5.7 | 259 | 67.0 | 75 | 86 |
| Example 50 | 7.0 | 5.5 | 222 | 83.0 | 60 | 79 |
| Example 51 | 8.0 | 4.0 | 180 | 76.0 | 67 | 78 |
| Comparative Example 25 | 7.0 | 1.6 | 730 | 3.1 | 74 | 85 |

As shown in Examples 46 to 51, blending appropriate amounts of the shrinkage-reducing agent having a branched structure containing three or more polyoxyalkylene chains in any one of its molecules (component A), the AE agent (component C), and the antifoaming agent (component D) is found to allow one to entrain high-quality air bubbles in a concrete to improve the freezing-thawing resistance.

On the other hand, as can be seen from Comparative Example 25, when the blending ratio "(component C)/(component D)" of the AE agent (component C) to the antifoaming agent (component D) is not a proper ratio, it becomes difficult to adjust the air content of the concrete, and as a result, the quality of the air bubbles entrained in the concrete and the freezing-thawing resistance of the concrete reduce.

Industrial Applicability

According to the present invention, there can be provided the following shrinkage-reducing agent for a hydraulic material and shrinkage-reducing agent composition for a hydraulic material each having high general-purpose property. Each of the agent and the composition does not require a combination with any other admixture, is inexpensive, suppresses a reduction in strength of a cured article, suppresses the generation of a crack in a cured concrete body by virtue of its excellent shrinkage-reducing function, and shows such good compatibility with a water-reducing agent as to impart an excellent water-reducing function. Further, each of the agent and the composition can improve the quality of entrained air with an antifoaming agent and an AE agent so easily as to be capable of imparting excellent freezing-thawing resistance to the cured concrete body to improve the durability of the cured concrete body. Accordingly, the agent and the composition are each useful as an additive for a cement.

The invention claimed is:

1. A shrinkage-reducing agent for a hydraulic material, wherein the shrinkage-reducing agent comprises a compound represented by the general formula (1):

$$R^1\text{—}[O\text{-}(A^1O)_m\text{—}R^2]_n \qquad (1)$$

where:
$R^1$ represents $R^1$ derived from a polyhydric alcohol represented by $R^1$—$[OH]_n$;
$A^1O$ represents an oxyalkylene group having 2 to 18 carbon atoms;
$R^2$ represents a hydrogen atom or a hydrocarbon group having 1 to 30 carbon atoms;
m represents an average added mole number of oxyalkylene groups $A^1O$'s;
n represents 3; and
m represents 30 to 150, and wherein oxyethylene groups account for 90 to 100 mol % of the $A^1O$'s.

2. A shrinkage-reducing agent for a hydraulic material according to claim 1, wherein the $A^1O$ represents an oxyalkylene group having 2 to 4 carbon atoms.

3. A shrinkage-reducing agent for a hydraulic material according to claim 2, wherein the polyhydric alcohol represented by $R^1$—$[OH]_n$ comprises a trimethylolalkane.

4. A shrinkage-reducing agent for a hydraulic material according to claim 1, wherein the polyhydric alcohol represented by $R^1$—$[OH]_n$ comprises a trimethylolalkane.

5. A shrinkage-reducing agent composition for a hydraulic material, comprising the following component A and component B, wherein a weight ratio "component A/component B" of the component A to the component B in terms of a solid content is 99.9/0.1 to 55/45:
  component A:
  at least one kind selected from a compound represented by the general formula (1) and a polyalkyleneimine:

$$R^1\text{—}[O\text{-}(A^1O)_m\text{—}R^2]_n \quad (1)$$

where:
  $R^1$ represents $R^1$ derived from a polyhydric alcohol represented by $R^1$—$[OH]_n$;
  $A^1O$ represents an oxyalkylene group having 2 to 18 carbon atoms;
  $R^2$ represents a hydrogen atom or a hydrocarbon group having 1 to 30 carbon atoms;
  m represents an average added mole number of oxyalkylene groups $A^1O$'s;
  n represents an integer of 3; and
  m represents 30 to 150, and wherein oxyethylene groups account for 90 to 100 mol % of the $A^1O$'s;
  component B:
  a polyoxyalkylene-based polymer.

6. A shrinkage-reducing agent composition for a hydraulic material according to claim 5, further comprising an AE agent (component C) and an antifoaming agent (component D) at a weight ratio "(component C)/(component D)" in terms of a solid content of 90/10 to 10/90.

7. A shrinkage-reducing agent composition for a hydraulic material according to claim 6, wherein a weight ratio "((component A)+(component C)+(component D))/(component B)" of a total of the component A, the component C, and the component D to the component B in terms of a solid content is 99.9/0.1 to 40/60.

8. A shrinkage-reducing agent composition for a hydraulic material according to claim 6, comprising a shrinkage-reducing agent A component, a polyoxyalkylene-based polymer component B, an AE agent component C, and an antifoaming agent component D, wherein:
  component A comprises a compound selected from general formula (1) wherein n represents 3, m represents 30 to 150; and
  component B comprises a copolymer obtained by copolymerizing a monomer (I) having a polyoxyalkylene group represented by the general formula (I) and at least one kind of monomer (II) selected from monomers represented by the general formulae (II-1) to (II-3):

[Chem. 1]

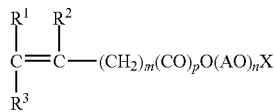

(I)

where:
$R^1$ and $R^2$ each represent a hydrogen atom or a methyl group;
$R^3$ represents a hydrogen atom, a methyl group, or —$(CH_2)_m$ $(CO)_pO(AO)_nX$;
m represents a number of 0 to 2;
p represents a number of 0 or 1;
AO represents an oxyalkylene group having 2 to 18 carbon atoms;
n represents an average added mole number of oxyalkylene groups AO's, and represents 2 to 300; and
X represents a hydrogen atom or a hydrocarbon group having 1 to 30 carbon atoms;

[Chem. 2]

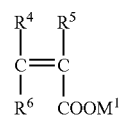

(II-1)

where:
$R^4$, $R^5$, and $R^6$ may be identical to or different from each other, and each represent a hydrogen atom, a methyl group, or —$(CH_2)_r$COOM2;
—$(CH_2)_r$COOM$^2$ may form an anhydride with COOM$^1$ or any other —$(CH_2)_r$COOM$^2$, and in this case, M$^1$ or M$^2$ of any one of these groups is absent;
M$^1$ and M$^2$ each represent a hydrogen atom, an alkali metal, an alkaline earth metal, an ammonium group, an alkylammonium group, a substituted alkylammonium group, or an organic amine group; and
r represents a number of 0 to 2;

[Chem. 3]

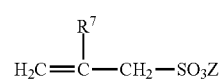

(II-2)

where:
$R^7$ represents a hydrogen atom or a methyl group; and
Z represents a hydrogen atom, an alkali metal, an alkaline earth metal, an ammonium group, an alkylammonium group, or a substituted alkylammonium group; and

[Chem. 4]

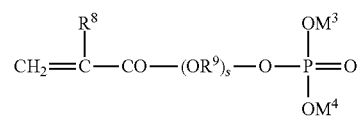

(II-3)

where:
$R^8$ represents a hydrogen atom or a methyl group;
$R^9$ represents an alkylene group having 2 to 12 carbon atoms;
s represents a number of 1 to 30; and
M$^3$ and M$^4$ each represent a hydrogen atom, an alkali metal, an alkaline earth metal, an ammonium group, an alkylammonium group, or a substituted alkylammonium group.

9. A shrinkage-reducing agent composition for a hydraulic material according to claim 5, wherein, in the general formula (1), the $A^1O$ represents an oxyalkylene group having 2 to 4 carbon atoms.

10. A shrinkage-reducing agent composition for a hydraulic material according to claim 5, wherein, in the general formula (1), the polyhydric alcohol represented by $R^1$—$[OH]_n$ comprises a trimethylolalkane.

11. A shrinkage-reducing agent composition for a hydraulic material according to claim 5, wherein the polyoxyalkylene-based polymer comprises a copolymer obtained by copolymerizing a monomer (I) having a polyoxyalkylene group represented by the general formula (I) and at least one kind of monomer (II) selected from monomers represented by the general formulae (II-1) to (II-3):

[Chem. 1]

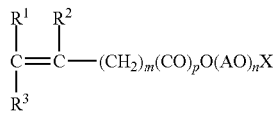

(I)

where:
$R^1$ and $R^2$ each represent a hydrogen atom or a methyl group;
$R^3$ represents a hydrogen atom, a methyl group, or —$(CH_2)_m(CO)_pO(AO)_nX$;
m represents a number of 0 to 2;
p represents a number of 0 or 1;
AO represents an oxyalkylene group having 2 to 18 carbon atoms;
n represents an average added mole number of oxyalkylene groups AO's, and represents 2 to 300; and
X represents a hydrogen atom or a hydrocarbon group having 1 to 30 carbon atoms;

[Chem. 2]

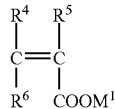

(II-1)

where:
$R^4$, $R^5$, and $R^6$ may be identical to or different from each other, and each represent a hydrogen atom, a methyl group, or —$(CH_2)_rCOOM^2$;
—$(CH_2)_rCOOM^2$ may form an anhydride with $COOM^1$ or any other —$(CH_2)_rCOOM^2$, and in this case, $M^1$ or $M^2$ of any one of these groups is absent;
$M^1$ and $M^2$ each represent a hydrogen atom, an alkali metal, an alkaline earth metal, an ammonium group, an alkylammonium group, a substituted alkylammonium group, or an organic amine group; and
r represents a number of 0 to 2;

[Chem. 3]

(II-2)

where:
$R^7$ represents a hydrogen atom or a methyl group; and
Z represents a hydrogen atom, an alkali metal, an alkaline earth metal, an ammonium group, an alkylammonium group, or a substituted alkylammonium group;

[Chem. 4]

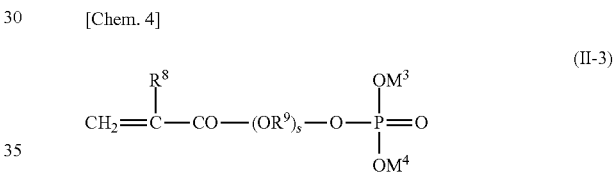

(II-3)

where:
$R^8$ represents a hydrogen atom or a methyl group;
$R^9$ represents an alkylene group having 2 to 12 carbon atoms;
s represents a number of 1 to 30; and
$M^3$ and $M^4$ each represent a hydrogen atom, an alkali metal, an alkaline earth metal, an ammonium group, an alkylammonium group, or a substituted alkylammonium group.

* * * * *